(12) United States Patent
Rostrup et al.

(10) Patent No.: US 11,648,678 B2
(45) Date of Patent: May 16, 2023

(54) SYSTEMS, DEVICES, ARTICLES, AND METHODS FOR CALIBRATION OF RANGEFINDERS AND ROBOTS

(71) Applicant: Kindred Systems Inc., San Francisco, CA (US)

(72) Inventors: Scott Rostrup, Toronto (CA); James Sterling Bergstra, Toronto (CA)

(73) Assignee: Kindred Systems Inc., San Francisco, CA (US)

( * ) Notice: Subject to any disclaimer, the term of this patent is extended or adjusted under 35 U.S.C. 154(b) by 187 days.

(21) Appl. No.: 16/765,444

(22) PCT Filed: Nov. 7, 2018

(86) PCT No.: PCT/CA2018/051405
§ 371 (c)(1),
(2) Date: May 19, 2020

(87) PCT Pub. No.: WO2019/095045
PCT Pub. Date: May 23, 2019

(65) Prior Publication Data
US 2020/0316780 A1    Oct. 8, 2020

Related U.S. Application Data

(60) Provisional application No. 62/588,821, filed on Nov. 20, 2017.

(51) Int. Cl.
*B25J 9/16*        (2006.01)
*B25J 9/02*        (2006.01)
(Continued)

(52) U.S. Cl.
CPC ............. *B25J 9/1692* (2013.01); *B25J 9/023* (2013.01); *B25J 15/04* (2013.01); *B25J 19/023* (2013.01)

(58) Field of Classification Search
CPC . B25J 9/1692; B25J 9/023; B25J 15/04; B25J 19/02; B25J 9/1694;
(Continued)

(56) References Cited

U.S. PATENT DOCUMENTS 9,211,643 B1    12/2015  Shirakyan et al.
9,381,645 B1 *   7/2016  Yarlagadda ............ G05B 19/42
(Continued)

FOREIGN PATENT DOCUMENTS

CA        2 882 968 A1    8/2018

OTHER PUBLICATIONS

Marvel et al., "Tools for Robotics in SME Workcells: Challenges and Approaches for Calibration and Registration", NISTIR 8093, Nov. 2015, 33 Pages.
(Continued)

*Primary Examiner* — Kira Nguyen
(74) *Attorney, Agent, or Firm* — Seed Intellectual Property Law Group LLP

(57) ABSTRACT

Systems, devices, articles, and methods, described in greater detail herein, including robotic systems which include at least one rangefinder, at least one manipulator, and at least one processor in communication with the at least one rangefinder, and methods of operation of the same. The at least one processor obtains rangefinder pose information which represents, at least, the at least one manipulator in a plurality of poses. The at least one processor obtains manipulator pose information, optimizes a model of mismatch between the rangefinder pose information and the manipulator pose information, wherein the model of mismatch includes a plurality of parameters, and updates at least one processor readable storage device with the plurality of parameters based at least in part on the optimization.

28 Claims, 12 Drawing Sheets

(51) Int. Cl.
*B25J 15/04* (2006.01)
*B25J 19/02* (2006.01)

(58) Field of Classification Search
CPC ........... G05B 2219/37269; G05B 2219/37425; G01C 25/00
See application file for complete search history.

(56) References Cited

U.S. PATENT DOCUMENTS

| | | |
|---|---|---|
| 2009/0118864 A1 | 5/2009 | Eldridge et al. |
| 2011/0280472 A1 | 11/2011 | Wallack et al. |
| 2012/0259462 A1 | 10/2012 | Aoba |
| 2012/0282064 A1* | 11/2012 | Payne ................... B63B 35/003 414/803 |
| 2015/0025683 A1 | 1/2015 | Amano |
| 2016/0039096 A1* | 2/2016 | Wallack .................... G06T 7/80 901/9 |
| 2017/0305014 A1 | 10/2017 | Gildert |
| 2018/0126553 A1* | 5/2018 | Corkum ............... G05B 19/423 |

OTHER PUBLICATIONS

International Search Report and Written Opinion, dated Feb. 13, 2019, for International Application No. PCT/CA2018/051405, 12 pages.
Extended European Search Report, dated Mar. 31, 2022, for European Application No. 18878456.5, 9 pages.

\* cited by examiner ns, and methods for calibration of rangefinders and robots

BACKGROUND

Technical Field

The present disclosure relates to calibration, and/or operation of robots and, more particularly, to robots including a rangefinder and a manipulator and calibration of the same.

Description of the Related Art

Robots

Robots are systems, machines, or devices that are capable of carrying out one or more tasks. A robot is an electro-mechanical machine controlled by circuitry, for example a processor following processor-executable instructions; a human operator controllable electro-mechanical machine; a robotic subsystem of another machine including another robot; or the like. A robot has the ability to move in a physical space and to accomplish physical tasks. Robots may be operated by a human operator, such as, via remote control, or may operate autonomously without control of an operator. Hybrid robots exist in which some functions are autonomous while others are operator controlled or control switches between autonomous and operator controlled modes. As well, a robot includes computational resources to preform computational tasks. The computational tasks can be in aid of the physical tasks.

End-Effectors

An end-effector or end of arm tool is a device attached to a robotic arm, manipulator, or appendage designed or structured to interact with an environment. Examples of end-effectors include grippers or graspers. End-effectors for robot operating in unstructured environments are devices of complex design. Ideally, these can perform many tasks, including for example grasp or grip or otherwise physically releasably engage or interact with an item or object.

Rangefinders

A rangefinder is a device that alone measures distance from the device to a target. The process can be repeated for moving targets (e.g. trace a target) or static targets (e.g., take a survey). Rangefinders may operate in combination with a human observer or without, so called automated rangefinder. Rangefinders, also called range finders or telemeters, include passive devices like stereoscopic or coincidence image rangefinders, and stadiametric marks in sites and scopes. Rangefinders also include active devices and systems, such as, sonar, radar, lidar, and the like, that compute distance from known velocity and time of flight measurements for reflected signals. Rangefinders include pluralities of cameras and associated devices that use stereo triangulation based on common targets in images from the pluralities of cameras to create range values. Rangefinders can create range images where a pixel value includes a distance value, e.g., in addition to an image intensity value.

BRIEF SUMMARY

A system including a frame, at least one processor, at least one rangefinder communicatively coupled to the at least one processor and, at least, temporarily coupled to the frame, at least one manipulator physically coupled to the frame, and at least one nontransitory processor-readable storage device communicatively coupled to the at least one processor. The at least one nontransitory processor-readable storage device stores processor-executable instructions which, when executed by the at least one processor, cause the at least one processor to obtain rangefinder pose information, and obtain for the at least one manipulator, manipulator pose information. The rangefinder pose information represents, at least, a first plurality of distances between the at least one rangefinder and a first part of the at least one manipulator in a plurality of poses. A respective distance in the first plurality of distances corresponds to at least one respective pose in the plurality of poses. The manipulator pose information represents a second plurality of distances for the plurality of poses. The at least one nontransitory processor-readable storage device further stores processor-executable instructions which, when executed by the at least one processor, further cause the at least one processor to optimize a model of a mismatch between rangefinder pose information and the manipulator pose information, where the model includes a plurality of parameters, and update the processor readable storage device with the plurality of parameters. The plurality of parameters is based at least in part on the optimization.

A method in a robotic system including at least one rangefinder, at least one manipulator, and at least one processor in communication with the at least one rangefinder. The method including obtaining, by the at least one processor from the at least one rangefinder, rangefinder pose information which represents, at least, a first plurality of distances between the at least one rangefinder and a first part of the at least one manipulator in a plurality of poses. A respective distance in the first plurality of distances corresponds to at least one respective pose in the plurality of poses. The further method including obtaining, by the at least one processor, manipulator pose information which represents, at least, a second plurality of distances for the plurality of poses, and optimizing, by the at least one processor, a model of mismatch between the rangefinder pose information and the manipulator pose information, where the model of mismatch includes a plurality of parameters, and updating at least one processor readable storage device with the plurality of parameters based at least in part on the optimization.

A robot may be summarized substantially as described and illustrated herein.

A system may be summarized as including a manipulator, and a rangefinder substantially as described and illustrated herein.

A system may be summarized as including a rangefinder and a processor based device substantially as described and illustrated herein.

A method of calibration of a rangefinder and robot, including a manipulator, substantially as described and illustrated herein.

A method of operation of a manipulator and at least on sensor may be summarized substantially as described and illustrated herein.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

Systems, devices, articles, and methods are described in greater detail herein with reference to the following figures in which.

DETAILED DESCRIPTION

Figure 1:
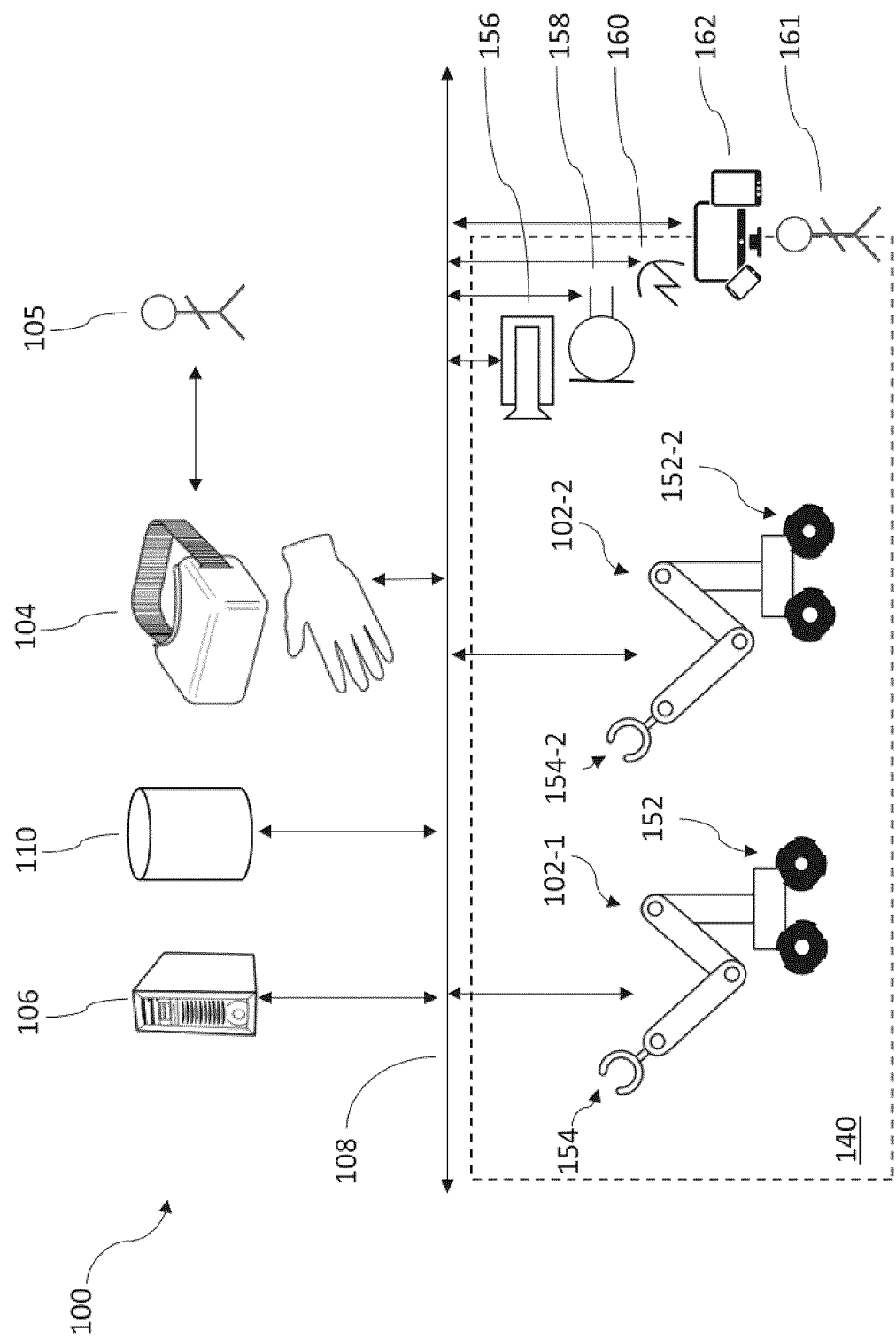
FIG. 1 is a schematic diagram illustrating a portion of a robotic system.

In the following description, some specific details are included to provide a thorough understanding of various disclosed embodiments. One skilled in the relevant art, however, will recognize that embodiments may be practiced without one or more of these specific details, or with other methods, components, materials, etc. In some instances, well-known structures associated with end-effectors and/or robotics, such as processors, sensors, storage devices, network interfaces, workpieces, tensile members, fasteners, electrical connectors, mixers, and the like are not shown or described in detail to avoid unnecessarily obscuring descriptions of the disclosed embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one", "an", or "another" applied to "embodiment", "example", means that a particular referent feature, structure, or characteristic described in connection with the embodiment, example, or implementation is included in at least one embodiment, example, or implementation. Thus, the appearances of the phrases "in one embodiment", "in an embodiment", or "another embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the user forms "a", "an", and "the" include plural referents unless the content clearly dictates otherwise. Thus, for example, reference to a robot including "an end-effector" includes an end-effector, or two or more end-effectors. It should also be noted that the term "or" is generally employed in its sense including "and/or" unless the content clearly dictates otherwise.

The headings provided herein are for convenience only and do not interpret the scope or meaning of the embodiments.

One source of error in robotic systems (e.g., systems including manipulators) with rangefinders stems from the combination of components and not the components themselves. For the example, a system including a manipulator and rangefinder has a source of error not found in the manipulator or rangefinder themselves. It is useful for a robot (e.g., robot including a manipulator and an end-effector) to accurately determine pose information (e.g., distance, position, orientation) for items in an environment with respect to the robot, e.g., robot's extent of travel (aka range). For a robot to automatically grasp common (e.g., daily, ordinary, vernacular) items the distances in the pose information may need to have sub-centimeter accuracy. Due to the nature of errors in rangefinders (e.g., intrinsic and extrinsic) and robots an automated calibration method may be beneficial to facilitate automated grasps and other tasks.

Described herein are systems, devices, articles, and methods where at a train-phase or time a robot and a rangefinder gather calibration data. For example, a robot including a manipulator and a removable target travels to a plurality of poses while the rangefinder produces a plurality of range values (e.g., depth images) associated with the plurality of poses. See, at least, FIGS. 2, 3, and 7-9, herein. Described herein are systems, devices, articles, and methods where during or after the train phase a processor updates a model based on the calibration data. See, at least, FIGS. 2 and 8, herein. The processor may also extract pose information from images received from at least one camera (see, at least, FIGS. 2 and 10, herein); change at least one set of pose information into a different coordinate system (see, at least, FIGS. 2 and 11, herein); and optimize the model (see, at least, FIGS. 2, 3, and 8, herein). Described herein are systems, devices, articles, and methods where during a run-phase a processor uses the model to update a range value received from a rangefinder. See, at least, FIGS. 2 and 12, herein.

FIG. 1 shows an exemplary system 100 in accordance with the present systems, devices, articles, and methods. Various components of system 100 are optional. As shown, system 100 includes robot 102-1 and robot 102-2 (collectively 102). Robots 102 may be associated with, e.g., communicatively coupled to, one or more optional operator interfaces, e.g., optional operator interface 104. Optional operator interface 104 may include one or more displays and input devices. System 100 includes a computer system 106, an example of a processor-based device. While illustrated as a pair of robots 102 and computer system 106, various implementations can include a greater number of robots (102) and/or computer systems (106). In some implementations, system 100 includes at least one nontransitory computer- and processor-readable data store or storage device 110.

Robots 102 and computer system 106 are communicatively coupled via a network or non-network communication channel 108. Examples of a suitable network or non-network communication channel 108 include a wire based network or communication channel, optical based network or communication channel, wireless network or communication channel, or a combination of wired, optical, and/or wireless networks or communication channels.

A human operator 105 at operator interface 104 can selectively pilot one or both of robots 102. In human operator controlled (or piloted) mode, the human operator observes representations of sensor data, for example, video, audio, or haptic data received from one or more environmental sensors or internal sensors. The human operator then acts, conditioned by a perception of the representation of the data, and creates information or executable instructions to direct robots 102 or other robot(s). Robots 102 operate in, and receive data about, an environment 140 that comprises a physical space. The term "about" is employed here in the sense of represent, characterize, or summarize. The data about an environment 140 is received from one or more sensors. In some implementations, the one or more sensors are on or otherwise carried by robots 102. In some implementations, the one or more sensors are external to or separate from robots 102, such as, camera 156, microphone 158.

In piloted mode, robots 102 execute robot control instructions in real-time (e.g., without added delay) as received from the operator interface 104 without taking into account or revision by the controller based on sensed information.

In some implementations, robots 102, operate without an operator interface 104 or human operator, e.g., autonomously. Robots 102 may operate in an autonomous control mode by executing autonomous control instructions. For example, computer system 106 or robots 102 can use sensor data from one or more sensors associated with operator generated robot control instructions and the operator generated robot control instructions from one or more times robots 102 was in piloted mode to generate autonomous robot control instructions for subsequent use. For example, by using deep learning techniques to extract features from the sensor data such that in autonomous mode the robots 102 autonomously recognize features and/or conditions in its environment and in response perform a defined act, set of acts, a task, or a pipeline of tasks. Exemplary acts include recognizing the presence of a red ball, or any colour ball, depending on the features extracted from the sensor data, and kicking the ball. In the absence of a ball, the robot executing the autonomous robot control instructions would not kick the air as if a ball was present.

In some implementations, the computer system 106 is a smaller processor based device like a mobile phone, single board computer, embedded computer, and the like. The computer system 106 may, in some instances, be termed or referred to interchangeably as a computer, server, or an analyzer 106. Computer system 106 may create autonomous control instructions for robots 102 or another robot. In some implementations, robots 102 autonomously recognize features and/or conditions in the surrounding environment as represented by a representation (e.g., presentation, depiction) of the environment and one or more virtual items composited into the environment, and in response to being presented with the representation perform one or more actions or tasks.

In some implementations, the computer system 106 includes at least one nontransitory computer- or processor-readable medium (e.g., nonvolatile memory for instance ROM, FLASH EEPROM, volatile memory for instance RAM, spinning media for instance a magnetic hard disk, optical disks) that stores processor-executable instructions, which when executed by at least one processor included in computer system 106 cause the at least one processor to define in part a control system for robots 102 and other agents. For example, computer system 106 may provide an application program interface (API) via which robots 102 or other agents can provide queries to and receive processor-executable instructions or processor-readable data in response. For example, computer system 106 may include a warehouse control system. A warehouse control system includes processor executable instructions, that in response to being executed, controls automated systems such as sortation systems, AS/RS, unmanned ground vehicles (UGVs), automatic guided vehicles (AGVs), sorters, and conveyors in the warehouse. The warehouse control system may direct "real-time" activities within warehouses and distribution centers. For example, a warehouse control system direct robots and workers, e.g., a conveyor or dispatch an AGV, or (de)activate a light in a pick to light system.

In some instances, robots 102 may be controlled autonomously at one time, while being piloted, operated, or controlled by a human operator at another time. That is, operate under an autonomous control mode and change to operate under a piloted mode (i.e., non-autonomous). In a third mode of operation robots 102 can replay or execute piloted robot control instructions in a human operator controlled (or piloted) mode. That is operate without sensor data and replay pilot data.

A robot, like robots 102, is an electro-mechanical machine controlled by circuitry, for example circuitry that includes a processor that executes and follows processor-executable instructions; a human operator controllable electro-mechanical machine; a robotic subsystem (or apparatus) of another machine including a robot; or the like. A robot performs physical acts, actions, or tasks, for example, working with tangible results and/or computational tasks. A robot has the ability to move in a physical space, such as environment 140, to accomplish physical tasks. As well, a robot includes computational resources, on-board and/or remote computational resources, to perform computational tasks. The computational tasks can be in aid of the physical tasks, e.g., planning, as a task, for accomplishing a tangible result to physical task. A robot has the ability to acquire information from sensors, on-board and/or remote sensors. A robot can be part of or included in a larger system like system 100.

A robot typically includes a propulsion or motion subsystem comprising of one or more motors, solenoids or other actuators, and associated hardware (e.g., drivetrain, wheel(s), treads) to propel the robot in a physical space. An example of a motion subsystem is a set of drivetrain and wheels, such as, drivetrain and wheels 152-1, 152-2 (collectively 152) of robot 102-1, 102-2, respectively. The space does not need to be horizontal or terrestrial. Examples of spaces include water, air, underground, vertical spaces, outer space and the like. The robots 102 may operate in distribution centre, stock room, or warehouse. These include a tangible place of storage for products. Principal warehouse activities include receipt of items, storage, order picking, and shipment.

A robot typically includes a manipulation subsystem comprising one or more appendages, such as, one or more arms and/or one or more associated end-effectors, arm and end-effector 154-1, 154-2 (collectively 154) of robot 102-1, 102-2. An end-effector is a device attached to a robotic arm designed to interact with the environment. End-effectors for robot operating in unstructured environments are devices of complex design. Ideally, these are capable of performing many tasks, including for example grasp, grip, physically releasably engage, or otherwise interact with an item.

System 100 includes a sensor subsystem comprising one or more sensors, such as, one or more imagers or cameras 156, and/or one or more microphones 158, and/or one more rangefinders 160. (Robots 102 may include an onboard sensor subsystem. See examples, disclosed herein at, at least, FIG. 2.) A sensor subsystem which acquires data that characterizes or represents the robots 102 in a context or scenario, and/or performing one or more tasks. The data includes environmental sensor information, or environment information, representative of environmental conditions external to robots 102. The data may include item pose information that represents pose of one or more items in environment 140. The data may include manipulator pose that represents pose for one or more parts of one more robots, such as, robots 102 including arm(s) and end-effector(s) 154. Pose information includes processor-readable information that represents a location, an orientation, or both. The pose information (e.g., item, manipulator) may be received from the rangefinder(s) 160, imager(s) or camera(s) 156, arm(s) and end-effector(s) 154, or robot(s) 102.

System 100 includes a worker interface system. System 100 includes one or more worker interfaces 162 coupled to network or non-network communication channel 108. The worker interface(s) 162 include input or output parts. An example of an output part is a display which can present explanatory text or a dynamic representation of robots 102 in a context or scenario. The explanatory text may include a declarative component, i.e., message or directive to a worker 161 to complete some task. For example, a dynamic representation robot includes video and audio feed, for instance a computer-generated animation. Useful video and audio formats include H264 and Opus respectively. Example of an input part includes a WIMP interface, and a scanner, e.g., which in response to a scan of a barcode or the like provides an item number or identifier. A worker 161 may observe or monitor the operation of system 100, robots 102 or the like from worker interface(s) 162. The worker 161 may engage in the operation of system 100 via worker interface(s) 162.

Figure 2:
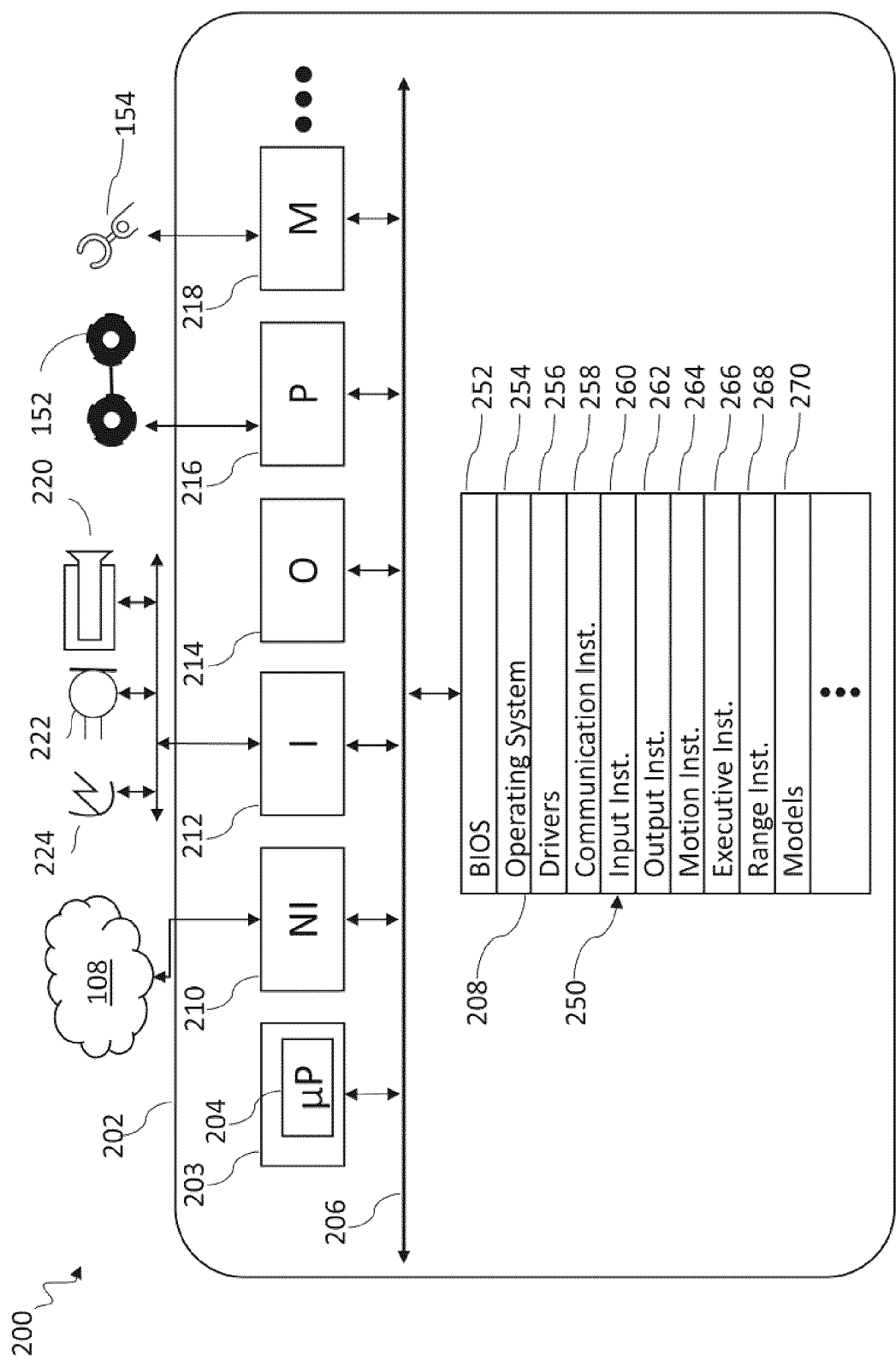
FIG. 2 is a schematic diagram illustrating an exemplary robot suitable for inclusion in the system of FIG. 1.

FIG. 2 schematically shows parts of a robot 200, including a processor, for use in the system 100, shown in FIG. 1, in accordance with the present systems, devices, articles, and methods. Robot 200 includes at least one body or housing 202, and a control subsystem 203 that includes at least one processor 204, at least one nontransitory computer- and processor-readable storage device 208, and at least one bus 206 to which, or by which, the at least one processor 204 and storage device(s) 208 are communicatively coupled. In some implementations, robot 200 comprises a sub-set of the illustrated robot 200, including control subsystem 203, bus(es) 206, storage device(s) 208, and network interface subsystem 210.

Robot 200 includes a network interface subsystem 210, e.g., a network interface device, that is communicatively coupled to bus(es) 206 and provides bidirectional communication with other systems (e.g., external systems external to the robot 200) via a network or non-network communication channel 108. The network interface subsystem 210 includes one or more buffers. Network interface subsystem 210 receives and sends processor-readable information related to a plurality of items, e.g., processor-executable instructions or specifications on how to process the plurality of items. Network interface subsystem 210 allows robot 200 to be communicatively coupled to a control system via an application program interface, e.g., an application program interface in system 106. Network interface subsystem 210 may be any circuitry effecting bidirectional communication of processor-readable data, and processor-executable instructions, for instance radios (e.g., radio or microwave frequency transmitters, receivers, transceivers), communications ports and/or associated controllers. Suitable communication protocols include FTP, HTTP, Web Services, SOAP with XML, WI-FI™ compliant, BLUETOOTH™ compliant, cellular (e.g., GSM, CDMA), and the like. Suitable transportation protocols include TCP/IP, SCTP, and DCCP.

Robot 200 includes an input subsystem 212 comprising one or more sensors that detect, sense, or measure conditions or states of robot 200 and/or conditions in the environment in which the robot operates, and produce or provide corresponding sensor data or information. Such sensors include cameras or other imagers, touch sensors, load cells, pressure sensors, microphones, meteorological sensors, chemical sensors or detectors, or the like.

Robot 200 includes an output subsystem 214 comprising output devices, such as, speakers, lights, and displays. Input subsystem 212 and output subsystem 214, are communicatively coupled to processor(s) 204 via bus(es) 206. In some implementations, input subsystem 212 includes receivers to receive position and/or orientation information. For example, a global position system (GPS) receiver to receive GPS data, two more time signals for the control subsystem 203 to create a position measurement based on data in the signals, such as, time of flight, signal strength, or other data to effect a position measurement. Also for example, one or more accelerometers can provide inertial or directional data in one, two, or three axes.

Robot 200 may include a propulsion or motion subsystem 216 comprising motors, actuators, drivetrain, wheels, and the like to propel or move the robot 200 within a physical space and interact with it. The propulsion or motion subsystem 216 propulsion or motion subsystem comprises of one or more motors, solenoids or other actuators, and associated hardware (e.g., drivetrain, wheel(s), treads), to propel the robot in a physical space. For example, the propulsion or motion subsystem 216 includes drive train and wheels 152.

Robot 200 includes a manipulation subsystem 218, for example comprising one or more arms, manipulators, end-effectors, associated motors, solenoids, other actuators, linkages, drive-belts, and the like coupled and operable to cause the arm(s) and/or end-effector(s) to move within a range of motions. The manipulation subsystem 218 is communicatively coupled to the processor(s) 204 via bus(es) 206. For example, manipulation subsystem 218 includes arm and end-effector 154.

A person of ordinary skill in the art will appreciate the components in robot 200 may be varied, combined, split, omitted, or the like. In some implementations one or more of the network interface subsystem 210, input subsystem 212, output subsystem 214, propulsion or motion subsystem 216 and/or manipulation subsystem 218 are combined. In some implementations, one or more of the subsystems (e.g., input subsystem 212) are split into further subsystems. In some implementations, bus(es) 206 is a plurality of buses (e.g., data buses, instruction buses, power buses) included in at least one body. For example, as part of a modular computing architecture where computational resources at distributed over the components of robot 200. That is, a robot, like robot 200, could in some implementations, have a processor in a left arm and a storage device in its thorax. In some implementations, computational resources are located in the interstitial spaces between structural or mechanical components of the robot 200. A data storage device could be in a leg and a separate data storage device in another limb. In some implementations, the computational resources distributed over the body include redundant computational resources.

The at least one processor 204 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The at least one processor 204 may be referred to in the singular, but may be two or more processors.

The at least one storage device 208 is at least one nontransitory or tangible storage device. In some implementations, storage device(s) 208 includes two or more distinct devices. The storage device(s) 208 can, for example, include one or more volatile storage devices, for instance random access memory (RAM), and one or more non-volatile storage devices, for instance read only memory (ROM), Flash memory, magnetic hard disk (HDD), optical disk, solid state disk (SSD), and the like. A person of skill in the art will appreciate storage may be implemented in a variety of ways such as a read only memory (ROM), random access memory (RAM), hard disk drive (HDD), network drive, flash memory, digital versatile disk (DVD), any other forms of computer- and processor-readable memory or storage medium, and/or a combination thereof. Storage can be read only or read-write as needed. Further, modern computer systems and techniques conflate volatile storage and non-volatile storage, for example, caching, using solid-state devices as hard drives, in-memory data processing, and the like.

The at least one storage device 208 includes or stores processor-executable instructions and/or processor-readable data 250 associated with the operation of robot 200, system 100, and the like. Herein processor-executable instructions or data includes processor-executable instructions and/or processor-readable data. Herein and associated drawings instructions includes processor-executable instructions and/ or processor-readable data.

The execution of the processor-executable instructions or data cause the at least one processor 204, or control subsystem 203, to carry out various methods and actions, for example via the propulsion or input subsystem 212, and/or manipulation subsystem 218. The processor(s) 204 can cause a robot, such as robot 200, to carry out various methods and actions, e.g., calibrate robotic system, identify and manipulate items. Processor-executable instructions and/or processor-readable data 250 can, for example, include a basic input/output system (BIOS) 252, an operating system 254, drivers 256, communication instructions or data 258, input instructions or data 260, output instructions or data 262, motion instructions or data 264, executive instructions or data 266, range instructions or data 268, and models 270.

Exemplary operating systems for operating system 254 include ANDROID™, LINUX®, and WINDOWS®. The drivers 256 include processor-executable instructions or data that allow processor(s) 204 to control circuitry of robot 200. The processor-executable communication instructions or data 258 include processor-executable instructions or data to implement communications between the robot 200 and an operator console or terminal, a computer, or the like. The processor-executable input instructions or data 260 when executed processes input from sensors in input subsystem 212. The processor-executable input instructions or data 260 may include machine vision instructions, which when executed, process images received by processor(s) 204 from one or more cameras, e.g., camera included in input subsystem 212.

Processor-executable output instructions or data 262 guide the robot 200 in interacting within the environment via components of manipulation subsystem 218 or output subsystem 214. Processor-executable output instructions or data 262 may invoke the processor-executable motion instructions or data 264.

Processor-executable motion instructions or data 264 guide robot 200 in moving within its environment via components in propulsion or motion subsystem 216. For example, processor-executable motion instructions or data 264 may aid robot 200 in performing: motion plan creation, inverse kinematics, or other motion related tasks. Processor-executable motion instructions or data 264 may include forward kinematic instructions, which, when executed, controls at least one manipulator or end-effector through specification of joint positions (e.g., angles, displacements). Processor-executable motion instructions or data 264 may include inverse kinematic instructions, which, when executed, controls at least one manipulator or end-effector by calculations of joint positions given a specification of a position of the at least one manipulator or end-effector. Processor-executable motion instructions or data 264 may implement, in part, various methods described herein, including those in and in relation to FIGS. 8, 9, and 11.

The processor-executable executive instructions or data 266 guide the robot 200 to reason, problem solve, plan tasks, perform tasks, and the like. The processor-executable executive instructions or data 266 may implement, in part, sortation of items, described in commonly assigned patent application No. 62/436,903 filed 2016 Dec. 20. The processor-executable executive instructions or data 266 may implement, in part, various methods described herein, including those in and in relation to FIGS. 8-11.

The processor-executable range instructions or data 268, when executed by at least one processor, cause the at least one processor to produce one or more range values from processor-readable data received from one or more rangefinders. The processor-executable range instructions or data 268, when executed by at least one processor, may cause the at least one processor to read or update a range model, e.g., range model included in models 270. The processor-executable range instructions or data 268, when executed by at least one processor, may cause the at least one processor to transform pose information from one coordinate systems or reference frame to another coordinate systems or reference frame. For example, range instructions or data 268 may cause the at least one processor to convert manipulator pose information or rangefinder pose information into a shared coordinate system, or create as input, corrected runtime pose information from runtime pose information. The processor-executable range instructions or data 268 may implement, in part, various methods described herein, including those in and in relation to FIGS. 8, 9, and so on.

The models 270 include processor-executable executive instructions or processor-readable data, and comprise models that assist a processor to convert data received from rangefinders into useful data for the operation of at least one manipulator. The models 270 may include an error model. An error model expresses a failure to correspond or match, discrepancies, or the like. An error model may quantify discrepancies between a set of first pose information and a set of second pose information for the same item. The models 270 may include a transformation model. A transformation model may transform pose information from a first coordinate system and reference frame of at least one manipulator to a second coordinate system and reference frame of at least one rangefinder, or the reverse. A transformation model may account for intrinsic and extrinsic errors in the at least one manipulator, in the at least one rangefinder or in a combination of the manipulator(s) and rangefinder(s). The models 270 may include a plurality of parameters. A parameter includes a quantity which is fixed, as distinct from ordinary variables, in a particular case, but which may vary in different cases. Parameters include a quantity whose value is specified when a set of processor executable instructions is executed. A respective parameter in the plurality of plurality of parameters includes, for example, a parameter in an affine transform. Examples of parameters included in the plurality of parameters are described herein in relation to, at least, FIGS. 8, 9, and so on.

Input subsystem 212 comprises sensors or transducers that acquire data for the robot. The data includes sensor information. Sensor information includes environmental sensor information representative of environmental conditions external to robot 200. Sensor information includes robotic conditions or state sensor information representative of conditions or states of the robot including the various subsystems and components thereof. Such sensors may include one or more of cameras or imagers (e.g., responsive in visible and/or nonvisible ranges of the electromagnetic spectrum including for instance infrared and ultraviolet), rangefinders, radars, sonars, touch sensors, pressure sensors, load cells, microphones, meteorological sensors, chemical sensors, or the like. Exemplary sensors include camera 220, microphone 222, and rangefinder like radar 224. Sensor information can, for example, include diagnostic sensor information that is useful in diagnosing a condition or state of the robot 200 or environment in which robot 200 operates. For example, such sensors may include contact sensors, force sensors, strain gages, vibration sensors, position sensors, attitude sensors, accelerometers, and the like. In some implementations, the diagnostic sensors include sensors to monitor a condition and/or health of an on-board power source (e.g., battery array, ultra-capacitor array, fuel cell array).

The output subsystem 214 comprises one or more output devices. The output subsystem 214 allows robot 200 to send signals into the robot's environment. Example output devices are speakers, displays, lights, and the like. Robot 200 may communicate with an agent, such as, a person, and another robot.

Figure 3:
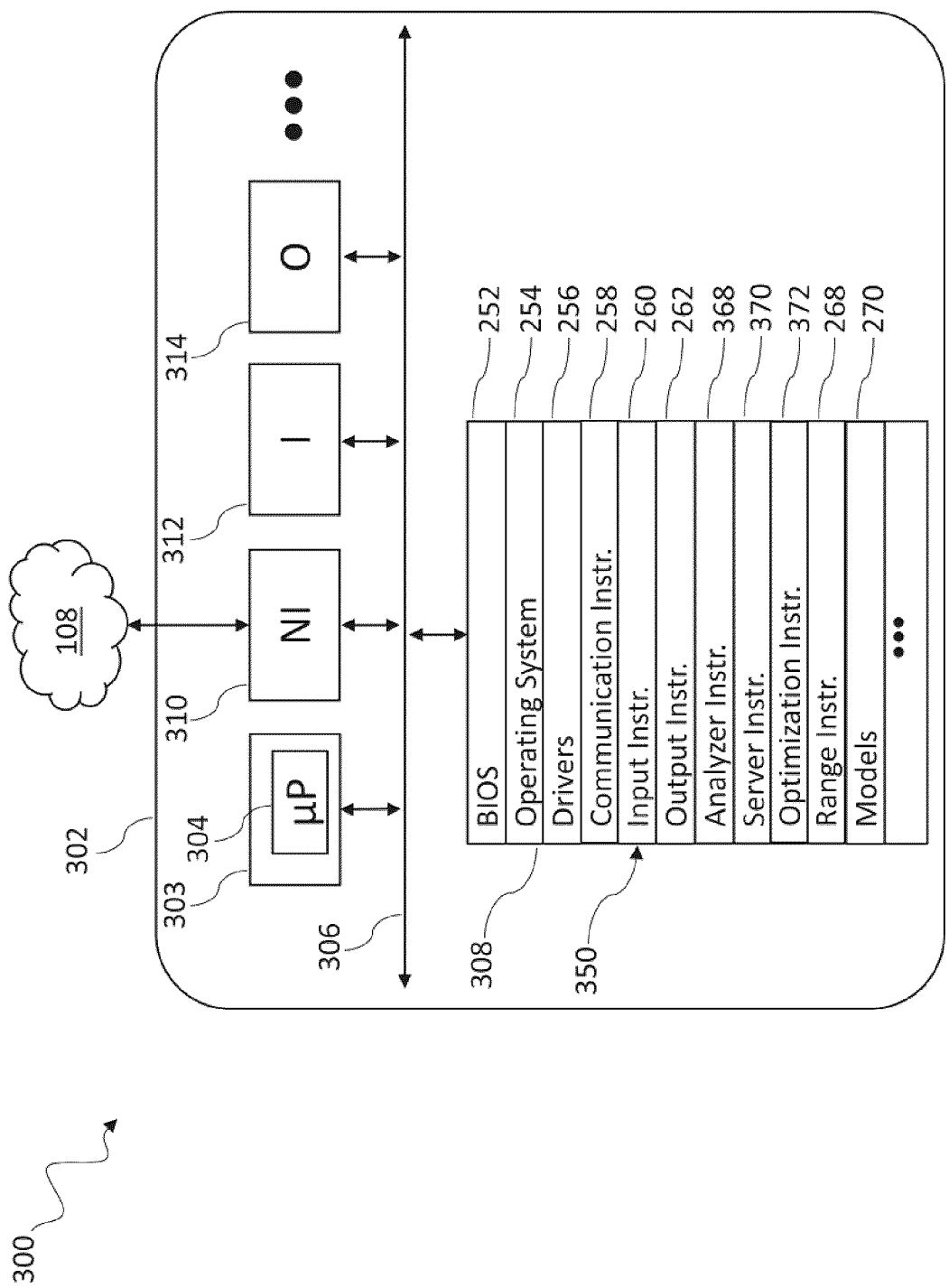
FIG. 3 is a schematic diagram illustrating an exemplary processor-based device suitable for inclusion in the system of FIG. 1.

FIG. 3 schematically shows exemplary parts of a system 300, including a processor, that may be used as computer system 106 in FIG. 1. System 300 shares some similar components with robot 200 but typically differs in lacking the propulsion or motion sub-system and the manipulation sub-system. System 300 has different components within some sub-systems, such as, an input subsystem 312 and output subsystem 314.

System 300 includes at least one body or housing 302, and a control subsystem 303 that includes at least one processor 304, at least one nontransitory computer- or processor-readable storage device 308, and at least one bus 306 to which the at least one processor 304 and the at least one nontransitory computer- or processor-readable storage device 308 are communicatively coupled. System 300 includes a network interface subsystem 310 is communicatively coupled to bus(es) 306 and provides a bi-directional communicative coupler among system 300 and other systems (e.g., processor-based devices associated with warehouse management systems, online storage providers) via network or non-network communication channel 108.

System 300 includes an input subsystem 312. Input subsystem 312 may include one or more user interface input devices, such as, a touch display, a keyboard, a mouse or other pointer device, a microphone, and a camera. In some implementations, input subsystem 312 is coupled to control subsystem 303 via network interface subsystem 310. In some implementations, input subsystem 312 includes one or more sensors such as environmental sensors.

System 300 includes an output subsystem 314 comprising one or more output devices, such as, displays, speakers, and lights. Input subsystem 312 and output subsystem 314, are communicatively coupled to the processor(s) 304 via bus(es) 206.

Storage device(s) 308 includes or stores processor-executable instructions or data 350 associated with the operation of system 300, or system 100. Processor-executable instructions or data (even reference numbers 252-262) are described herein and with appropriate changes are applicable to system 300, e.g., absence of a motion subsystem. In various implementations, storage device(s) 308 includes or stores one or more of: processor-executable analyzer instructions or data 368, processor-executable server instructions or data 370, processor-executable optimization instructions or data 372, range instructions or data 268, and models 270 may implement, in part, various methods described herein, including those in and in relation to FIGS. 8-11.

Processor-executable analyzer instructions or data 368, when executed by control subsystem 303, generates autonomous robot control instructions. Processor-executable server instructions or data 370, when executed by processor(s) 304, guide system 300 to coordinate the operation of system 100, and/or to act as a mediator between robots 102, computer system 106, and the like. Processor-executable optimization instructions or data 372, when executed by processor(s) 304, guide system 300 to optimize a model, such as, a mismatch model. Processor-executable optimization instructions or data 372 may include gradient decent instructions, simulated annealing instructions, tabu search instructions, and the like.

Figure 4:
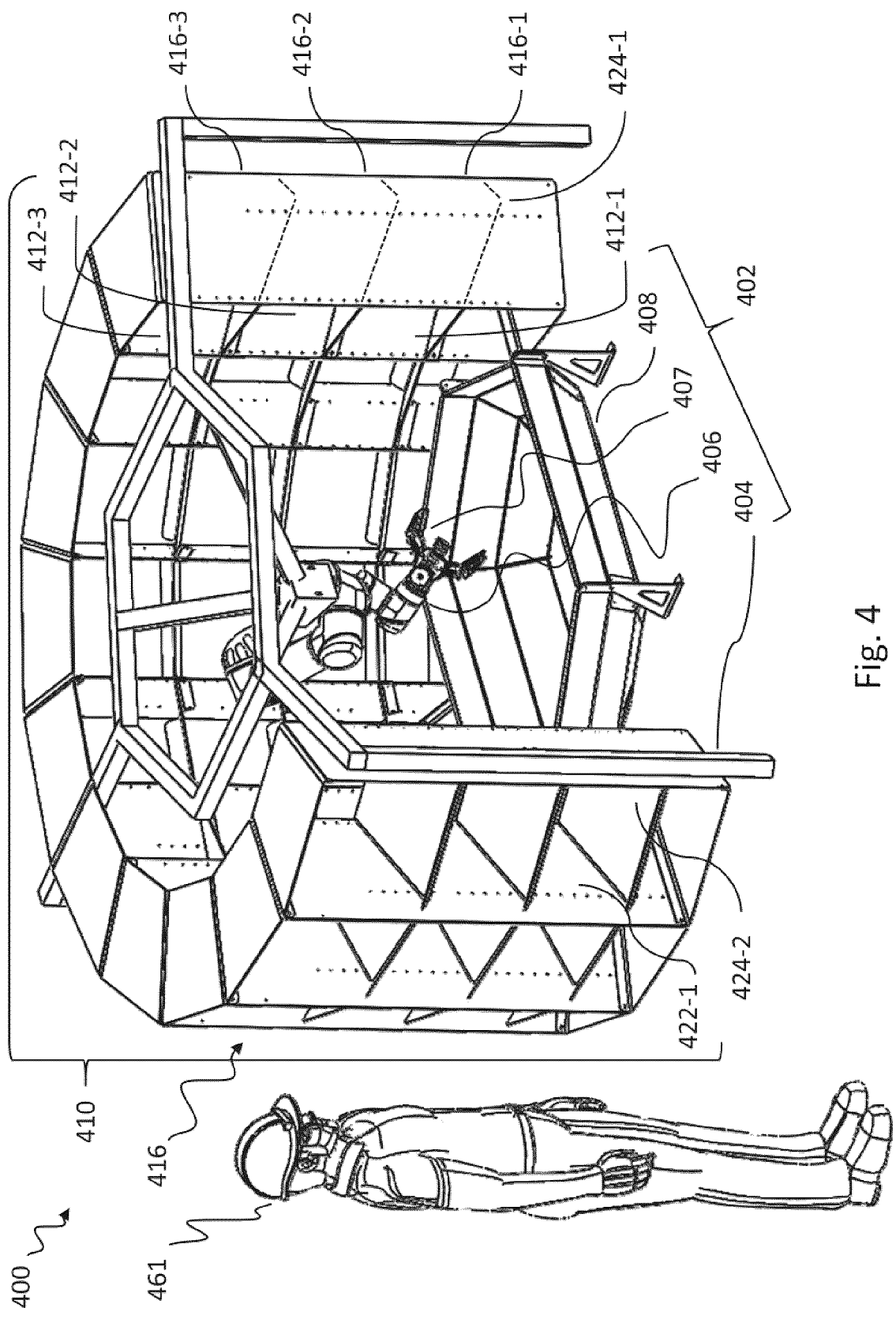
FIG. 4 illustrates, in a perspective view, an exemplary device that includes at least one end-effector, reception areas, and extraction areas.
Figure 5:
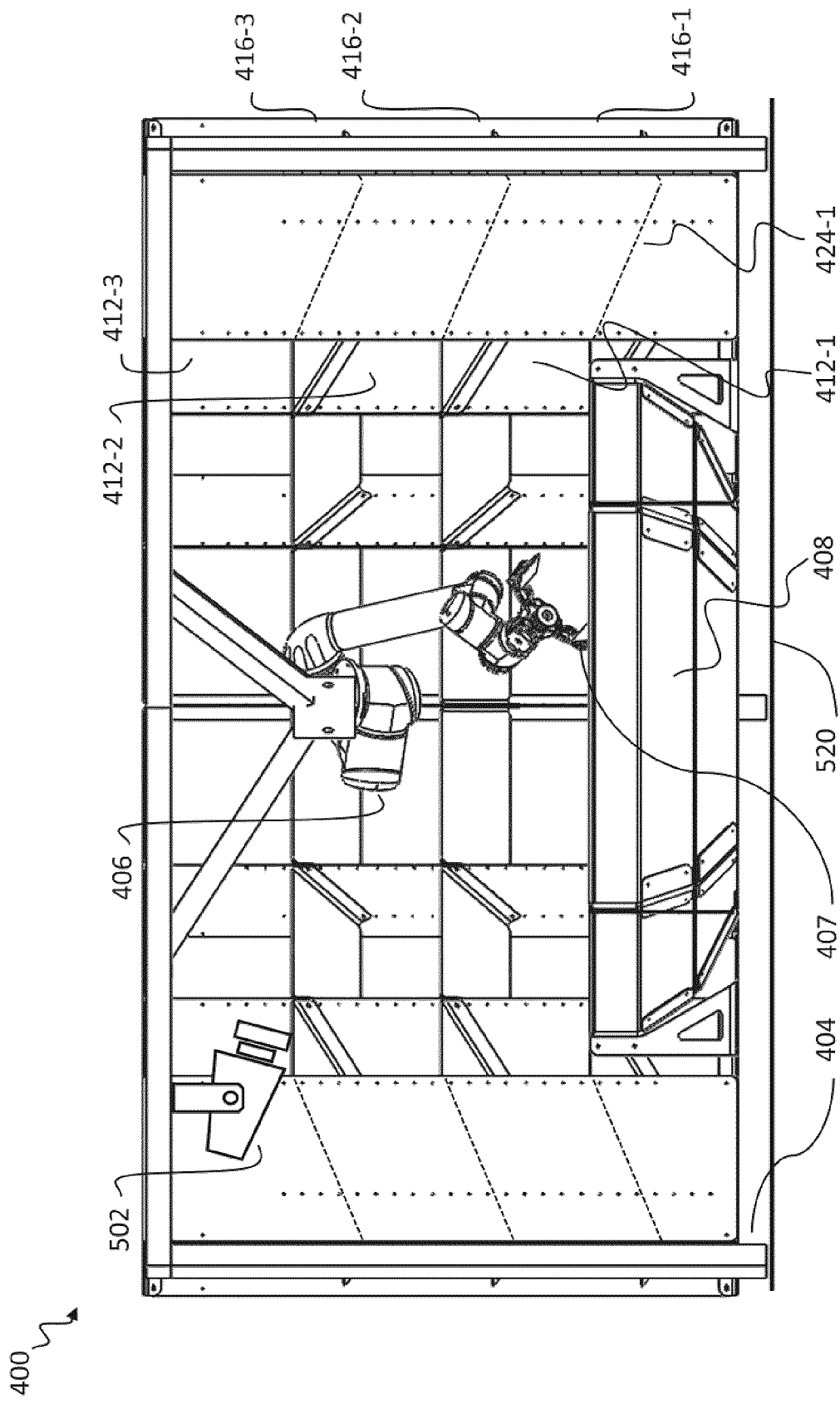
FIG. 5 illustrates, in elevation view, the device shown in FIG. 4.
Figure 6:
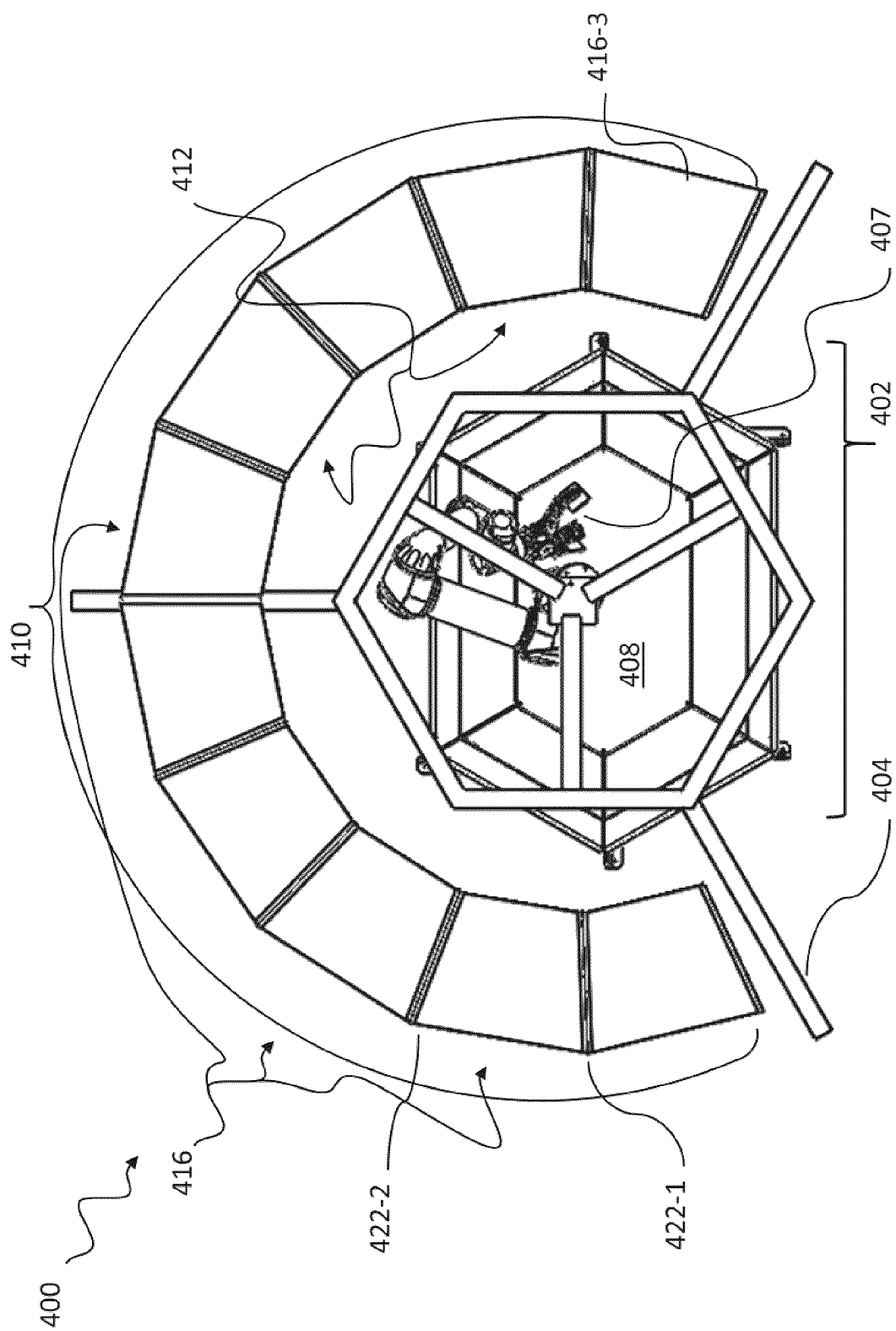
FIG. 6 illustrates, in plan view, the device shown in FIG. 4.
Figure 7:
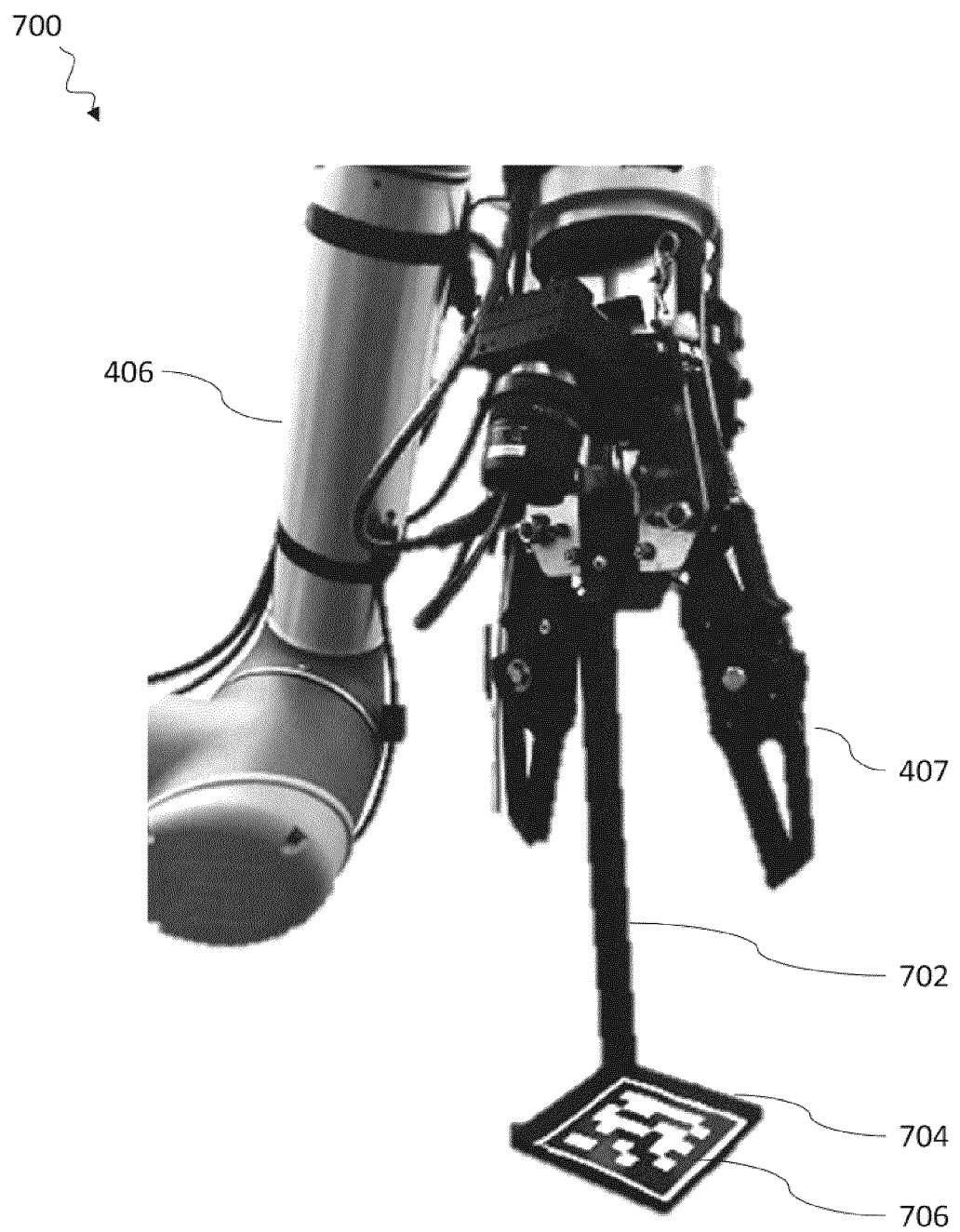
FIG. 7 illustrates, in perspective view, a removable target that may be coupled to a manipulator, such as shown in FIG. 4.

FIG. 4 illustrates, in a perspective view, an exemplary device 400 in accordance with the present systems, methods, and articles. FIG. 5 is an elevation view of device 400, and FIG. 6 is a plan view of device 400. Some components included in one view are not shown in a corresponding view. FIG. 7 includes an example of a target that may be physically coupled to at least one manipulator, including any manipulator shown or described in or in relation to FIGS. 4-6.

FIG. 4 illustrates, in a perspective view, an exemplary device 400, along with a human worker 461. Device 400 includes at least one end-effector 407.

Device 400 includes an input part 402 and an output part 410. In some implementations, input part 402 includes a frame 404 which may be coupled or connected to a base, e.g., floor, ground, or platform. One or more multi-joint manipulators 406, e.g., robotic arm, may be coupled or connected to frame 404. A manipulator included in the one or more multi-joint manipulators 406 is a mechanism which includes an assembly of links and joints. Links include rigid sections and joints are the couplers or connector between two links, typically providing for movement of one link relative to the other. Manipulator(s) 406 may couple to at least one end-effector 407 distally disposed on manipulator(s) 406 relative to frame 404. End-effector(s) 407 interacts with an environment or items within the environment. Herein device 400 and methods described herein are described as being performed by manipulator and end-effector. However, device 400 and methods described herein, such as method 1000, may include at least one manipulator or end-effector.

The manipulator(s) 406 and associated end-effector(s) 407 may move articles, work pieces, or items to, from, and within input space 408. Input space 408 may be disposed proximate to end-effector(s) 407 such that end-effector(s) 407 may grasp workpieces or items in input space 408. The end-effector(s) 407 and associated manipulator(s) 406 may move workpieces or items to, from, and around output space 410. The output space may include a plurality of reception spaces 412 (e.g., cubbies) that may be accessed from the opposite side at extraction spaces 416.

Manipulator(s) 406 may couple to at least one end-effector 407 distally disposed on manipulator(s) 406 relative to frame 404. Herein device 400 and methods 800, 900, 1000, et seq. are described as being performed by manipulator and end-effector. However, device 400 and methods described herein may include at least one manipulator or end-effector.

The manipulator(s) 406 and associated end-effector(s) 407 may move items to, from, and within input space 408. Input space 408 may be disposed proximate to end-effector(s) 407 such that end-effector(s) 407 may grasp workpieces or items in input space 408. The end-effector(s) 407 and associated manipulator(s) 406 may move workpieces or items to, from, and around input space 408. The manipulator(s) 406 is positionable in a plurality of poses that may include poses used to move items to, from, and within input space 408. Manipulator(s) 406 may be a lightweight six joint industrial robot arm, such as, a UR5™ from Universal Robots A/S of Odense, DK-83. The UR5 arm has a lifting ability of 5 Kg and have a working radius of 850 mm. Frame 404 may be sized to allow manipulator 406 to move largely unimpeded by frame 404. The UR5 arm may be fitted with an end-effector such as an EZGRIPPER™ from Sake Robotics of Redwood City, Calif., US. Manipulator(s) 406 may be a six joint robot arm, such as, a CR-7iA™ and CR-7iA/L™ robot arm from Fanuc America Corp., Rochester Hills, Mich., US. The CR-7iA arm has a lifting ability of 7 Kg and have a working radius of 717 mm and 911 mm for the CR-7iA/L™ arm. The CR-7iA arm may be fitted with an end-effector such as shown and described in commonly assigned U.S. Patent Applications Nos. 62/473,853 and 62/515,910 filed 2017 Mar. 20 and 2017 Jun. 6.

A plurality of items may be disposed in input space 408. The plurality of items may be referred to as a batch or group, may be of two or more types, or may be associated with two or more specified or defined, partitions (i.e., parts) of the plurality of items. The plurality of items item may be added to input space 408 in tranches, e.g., one container at a time with intervening action by at least one processor or end-effector(s) 407. Device 400 may be used in a way such that as successive items are added to items already present in input space 408 the addition of items is regarded as correct when the added items partially or fully complete the batch. That is, when one or more items are present in input space 408 a correct procedure could be to only allow addition of further items to input space 408 when the further items complete the batch. For example, two containers may be placed or dumped into an input space 408. One human worker 461 could provide the two containers or two different workers to provide the two containers including items. There could be some or no time separation between the adding items from the two containers.

Device 400 includes a plurality of reception spaces 412-1, 412-2, 412-3 (only three called out for clarity of drawing, collectively 412) proximate to input space 408 and manipulator(s) 406. For example, the end-effector(s) 407 and associated manipulator(s) 406 may be moveable to be at least proximate with the plurality of reception spaces 412. The end-effector(s) 407 and associated manipulator(s) 406 may move items from input space 408 to the plurality of reception spaces 412, or to, from, and around in input space 408. The end-effector(s) and associated manipulator(s) 406 may grasp a first respective item from a plurality of items in input space 408. The end-effector(s) 407 and associated manipulator(s) 406 may transfer the first respective item to a first reception space in the plurality of reception spaces 412, e.g., reception space 412-1. The end-effector(s) 407 and associated manipulator(s) 406 may grasp a second respective item from the plurality of items, and may transfer the second respective item to the first reception space (e.g., reception space 412-1) or a second reception space (e.g., reception space 412-2, or 412-3).

Device 400 may include a plurality of extraction spaces 416-1, 416-2, 416-3 (only three called out for clarity of drawing, collectively 416). The plurality of extraction spaces 416 may correspond to (e.g., one to one) the plurality of reception spaces 412. For example, reception space 412-1 may correspond to extraction space 416-1, for instance the reception space 412-1 corresponding extraction space 416-1 may be coupled via a passage therebetween or otherwise provide access for items placed in the reception space 412-1 to transit to the corresponding extraction space 416-1. That is an item transferred from input space 408 to reception space 412-1 may be retrieved from extraction space 416-1. The plurality of extraction spaces 416 may overlap to (e.g., one to one) the plurality of reception spaces 412. A pair of one reception space and one extraction space may include an overlapping volume or area. The one reception space may be accessed via a first opening and the one extraction space may be accessed via a second opening.

Device 400 may include a plurality of septums 422-1 (only one called out for clarity of drawing). A respective septum, e.g., septum 422-1, may be disposed between and separate a respective pair of reception spaces 412, or a respective pair of extraction spaces 416. That is, a septum 422-1 may define a boundary between a pair of spaces, e.g., separate a respective pair of reception spaces 412, a respective pair of extraction spaces 416, or a reception space and an extraction space.

Device 400 may include a plurality of slides 424-1, 424-2 (only two called out for clarity of drawing, collectively 424). A respective slide, e.g., slide 424-1, may be disposed between and couple a reception space and an extraction space, e.g., reception space 412-1 and extraction space 416-1. That, is a slide included in the plurality of slides 424 may allow for one or more items to be transferred (e.g., slide) from a reception space and a corresponding extraction space. The slide may be arranged such that end-effector(s) 407 may release an item in a reception space and a worker (e.g., robot 200 or human worker 461) may extract or retrieve the item from a corresponding extraction space.

FIG. 5 shows an exemplary arrangement of frame 404, manipulator(s) 406, end-effector(s) 407, input space 408, reception spaces 412, and extraction spaces 416. FIG. 5 illustrates device 400 in elevation view from a point near the bottom right corner of FIG. 4. The reception spaces 412 are in a position superior to input space 408. However, the reception spaces 412 may be positioned even with or below input space 408. Manipulator(s) 406 may hang from frame 404, extend from a pedestal to be moveably proximate to input space 408 and the reception spaces 412.

Device 400 may include a plurality of slides 424. For example, slide 424-1 may be disposed between and couple reception space 412-1 and extraction space 416-1. Slide 424-1 may passively allow for one or more items to be transferred from reception space 412-1 to extraction space 416-1, for example under influence of the force of gravity. That is an item may slide, roll, or fall from reception space 412-1 to extraction space 416-1 and the may be item in contact with slide 424-1 as it slides, rolls, or falls.

Device 400 may include at least one sensor or transducer, for example, camera 502 or other imager. The at least one sensor may include one or more sensors that detect, sensor, or measure conditions or states of device 400 and/or conditions in the environment to device 400, and provide corresponding sensor data or information including information about the state of input space 408, reception spaces 412, and extraction spaces 416. Such sensors or transducers include cameras or other imagers, rangefinders, bar code scanners, touch sensors, load cells, pressure sensors, microphones, RFID readers or interrogators or radios, or the like. The at least one sensor or transducer may be arranged in a sensor subsystem communicatively coupled to at least one processor. The at least one sensor or transducer may be physically coupled to the frame 404. In some implementations, at least one sensor or transducer may be, at least temporarily, at a fixed location with respect to some fixed element of device 400, e.g., a rangefinder in a room with device 400, and fixed with respect to the base of manipulator 406.

One or more parts of device 400 may be coupled to, e.g., rest on, be affixed to, a platform 520. Human worker 461 may stand on platform 520 or a platform above or below platform 520.

FIG. 6 illustrates, in plan view, device 400 including an exemplary arrangement frame 404, input part 402, input space 408, output part 410, reception spaces 412, and extraction spaces 416. As illustrated, output part 410 including reception spaces 412 may wrap or curve around part of input part 402 including input space 408. Output part 410 including extraction spaces 416 may wrap or curve around part of input part 402. Thus, the device 400 may have an annular shape or partial annular shape or profile, for instance as viewed from a top of the device looking directly down at the device.

Device 400 may include an error cubby or extraction space, such as, extraction space 416-3. The extraction space 416-3 may be used to contain error items. For example, when device finds an unidentifiable item in input space 408, the manipulator(s) 406 and end-effector(s) 407 may place the unidentifiable item in extraction space 416-3. A second agent (e.g., a robot or human worker) may find an item mistakenly placed or forgotten in an extraction space in extraction space 416-3. Items in extraction space 416-3 may be processed by a second agent, such as, a robot or a human worker, to perform error triage. In error triage the second agent may direct the items in extraction space 416-3, those items also known as error items, to an appropriate location in device 400 or an ancillary container or location. The second agent may perform error triage by exchanges of queries and responses with a control system and a storage device.

Device 400 may include an output device (not shown) communicatively coupled to at least one processor, e.g., processor(s) 304. The at least one processor may direct the output device display of one or more visual indications associated with one or more extraction space. The visual indication may convey information representing or defining a space status for respective extraction space or associated part of a plurality of parts. The space status may be a null, complete, incomplete, in process, or the like. The visual indication may convey a part is complete or incomplete. The visual indication may be based on the processor-readable information, such as, processor-readable error information that represents an incomplete space status, or the processor-readable completion information that represents a complete space status. The at least one processor may operator, e.g., selectively operate the output device in response to execution of processor-executable instructions. In various implementations, the at least one processor may generate a signal that includes processor-readable error information that represents space status information.

Device 400 may include, as or in an output device, one or more lights proximately disposed to the respective extraction space (not shown) and communicatively coupled to the at least one processor, e.g., processor(s) 304. Device 400 may include a plurality of lights disposed on device 400 in location near extraction spaces 416. Device 400 may include as or in an output device an augmented reality display for an observer (e.g., robot or worker 461). and communicatively coupled to the at least one processor. An example of an augmented reality display are shown in FIG. 1 at operator interface 104. The augmented reality display may be a display headset including a display and attitude or direction sensor, such as, an OCULUS RIFT™, or ALTERGAZE™, available, respectively, from Oculus VR of Menlo Park, Calif., US; and Altergaze Ltd of London, UK. Device 400 may include as or in the output display in communication with the at least one processor, e.g., part of worker interface(s) 162 shown in FIG. 1. Operation of one or more output devices is described herein at, at least, FIG. 3.

FIG. 7 illustrates, in perspective view, a manipulator and target system 700. Manipulator and target system 700 may include a manipulator 406 and an end-effector 407. Manipulator and target system 700 may include a standoff 702 coupled at a first end to the manipulator 406 or end-effector 407. A standoff includes a staff (as shown) or any member, body or other structure that projects or is positioned away or spaced from another body or surface. The standoff 702 at a second end may be coupled to (e.g., connected to) a holder 704, e.g., a mechanical structure that holds, contains, or supports one or more items. In some implementations, holder 704 includes a flat region to hold (e.g., keep, receive, retain) a target 706. That this, in some implementations, the target 706 is removably coupled (e.g., coupled magnetically) to the manipulator 406.

Target 706 is an item to which an instrument may be aimed, e.g., an optical target, an optical marker. Target 706 may be an item that visually distinguishes itself, and optionally distinguishes bodies to which the target 706 is coupled to, from the environment. The target 706 may provide information regarding position, direction, and the like. Target 706 may act as a point of reference, a feature or a point in a measurement.

An agent such as human worker, e.g., human worker 461 (FIG. 4) or a robot, e.g. robot 102 (FIG. 1), may physically couple one or more of the standoff 702, holder 704, and target 706 to manipulator 406 or end-effector 407. The agent may change the target 706 to one of variety of useful targets or markers. Examples of markers include AprilTag markers, ARTag markers, Aurco markers, CalTag markers, Charuco markers, Studierstube markers, and other fiducials.

The following organizations distribute tools to create the markers described above as follows. Tools for AprilTag markers from APRIL Robotics Laboratory of Computer Science and Engineering department at the University of Michigan, Ann Arbor, Mich., US. Tools for ArtTag markers from Human Interface Technology Lab, University of Washington, Seattle, Wash., US. Tools for Aruco Markers from Applications of Artificial Vision research group of the University of Córdoba, Rabanales campus, Córdoba, ES-0, ES. Tools for CalTag markers from Imager Lab of Department of Computer Science at the University of British Columbia, Vancouver, BC, CA. Tools for Charuco markers are available from Open CV, an online library of processor-executable instructions. Tools for Studierstube markers are available from Institute for Computer Graphics and Vision, Graz University of Technology, Graz, AT-6, AT.

The manipulator and target system 700 may be used in one or more methods described herein, including, methods 800, 900, and 1000.

Figure 8:
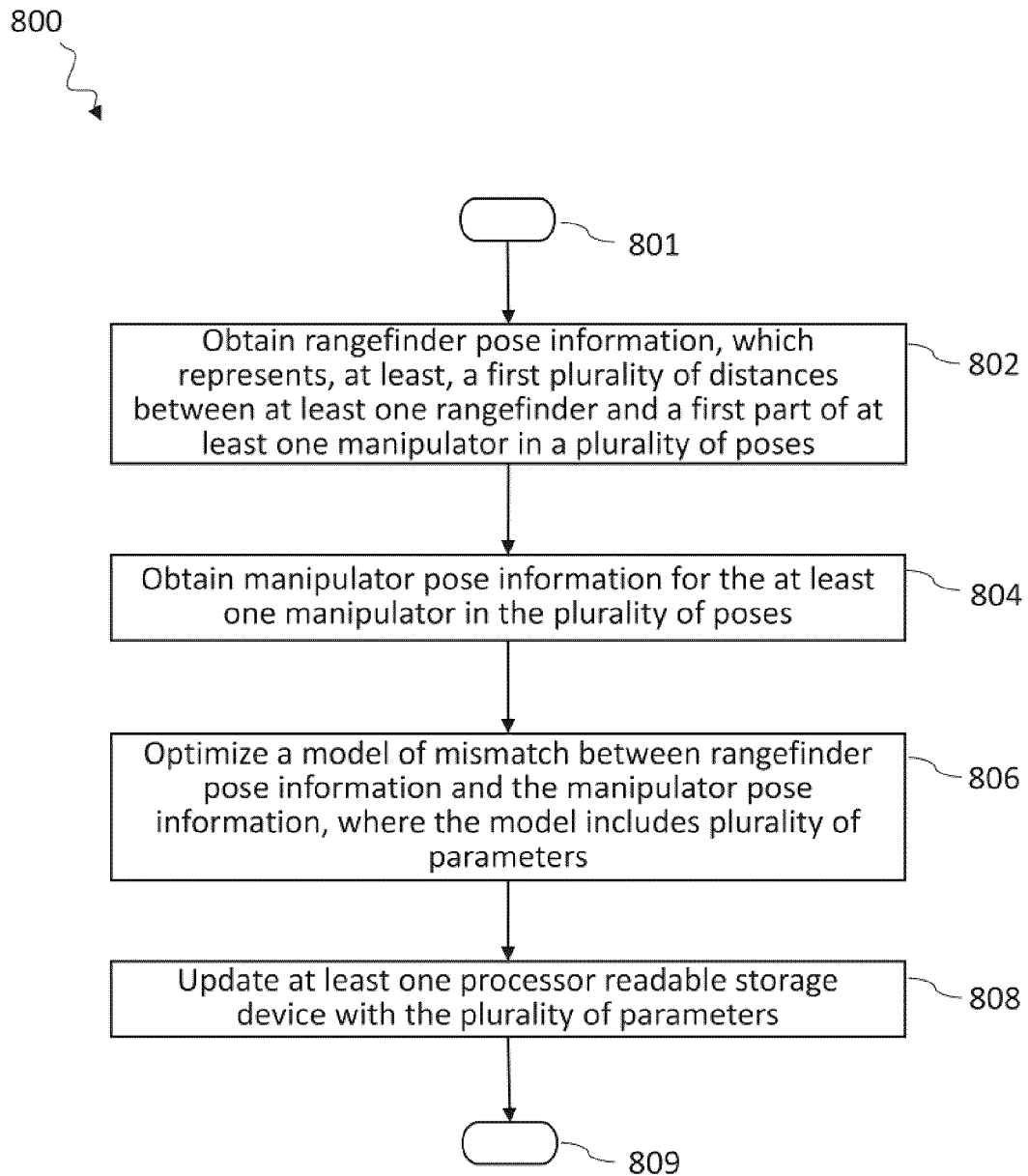
FIG. 8 is a flow-diagram of an implementation of a method of operation in a system including at least one processor, at least one manipulator, and at least one rangefinder.

FIG. 8 shows method 800 controlled by circuitry, e.g., at least one hardware processor. Method 800 is a method of operation of a system including at least one rangefinder and at least one manipulator. Those of skill in the art will appreciate that other acts may be included, removed, and/or varied or performed in a different order to accommodate alternative implementations.

Method 800 is described as being performed by at least one rangefinder, at least one manipulator, and a controller. However, method 800 may be performed by two or more of any of the rangefinder, manipulator, and controller. The at least one rangefinder may include, for example, radar 224, or one or more imagers or cameras 156. The at least one manipulator (e.g., manipulator 406) may be part of a robot (e.g., device 400). Method 800 may be performed by or in conjunction with, other components, such as those found in system 100, computer system 106, robot 200, and system 300.

For performing part or all of method 800, the controller may be at least one hardware processor. A hardware processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The hardware processor may be referred to herein by the singular, but may be two or more processors. The hardware processor(s) may, for example, execute one or more sets of processor-executable instructions and/or data stored on one or more nontransitory processor-readable storage devices. For performing part or all of method 800 one or more robots may be included in the operation of a robotic system. Exemplary robots and components are described herein. Examples of a controller includes processor and processor systems (e.g., control subsystem 203 executing control range instructions or data 268).

Method 800 begins at 801, for example in response to a call from a routine or program, start up or an application of power to the system, or otherwise invoked. At 802, the controller obtains (e.g., gains, acquires, receives) rangefinder pose information. For example, the controller receives rangefinder pose information from a rangefinder. The rangefinder pose information may represent a first plurality of distances between the rangefinder and a first part of a manipulator in a plurality of poses. At 802, the controller may cause the at least one rangefinder to capture the rangefinder pose information, such as, the first plurality of distances. At 802 the controller, or a processor included in the at least one rangefinder, may extract the rangefinder pose information from the first plurality of distances. In some implementations, the rangefinder(s) operate autonomously to capture range values, images, and the like. The rangefinder(s), for instance, may spit out range values or images, continuously, periodically, aperiodically independent of the controller. The controller may receive the range values, images, and the like as produced or sample from the range values, images, and the like.

At 804, the controller obtains manipulator pose information for the at least one manipulator in the plurality of poses. The manipulator(s) may be in a plurality of poses. The manipulator pose information comprises processor readable information which represents the pose (e.g., location, orientation) of one more links in the manipulator(s). Pose information comprises information about an item: attitude or orientation in combination with a position or location. In some implementations, the manipulator pose information may be obtained from a manipulator control system separate from controller. The manipulator pose information may be received from one or more actuators or sensors included in the least one manipulator. Exemplary actuators include electric motors, solenoids, pistons and cylinders, and valves. In some implementations, the controller obtains the manipulator pose information by inference over data received from the one or more actuators or sensors included in the least one manipulator. The poses may be within the extent of travel of the manipulator. In some implementations, e.g., when method 800 is performed by a system including manipulator and target system 700, the poses may be beyond the extent of travel of the manipulator, e.g., in an amount commensurate with extra length of standoff 702.

At 806, the controller optimizes a model of mismatch between the rangefinder pose information and the manipulator pose information. The controller optimizes (e.g., reduces a measure of mismatch, makes as good as possible) mismatch (e.g., failure to correspond, discrepancy between) between poses for one or more common items as measured or known to the at least one rangefinder or the at least one manipulator. The controller may vary the values of a plurality of parameters included in the model of mismatch to reduce the mismatch between the manipulator pose information and the rangefinder depth information. The controller may end optimization after a defined or determined time, or when an output of the model of mismatch is below a threshold, or the like. The degree of mismatch may be quantified by a metric such as least square error, maximum error, or the like.

At 808, the controller updates at least one processor readable storage device with the plurality of parameters. The parameters may be parameters based at least in part on the optimization in 806. The controller may update the readable storage device(s) with values for the plurality of parameters from 806. For example, the controller updates storage device(s) 208 at, for example, models 270.

Method 800 ends at 809 until invoked again. Method 800 may be followed one or more other methods described herein. Method 800 may include one or more other methods described herein.

Figure 9:
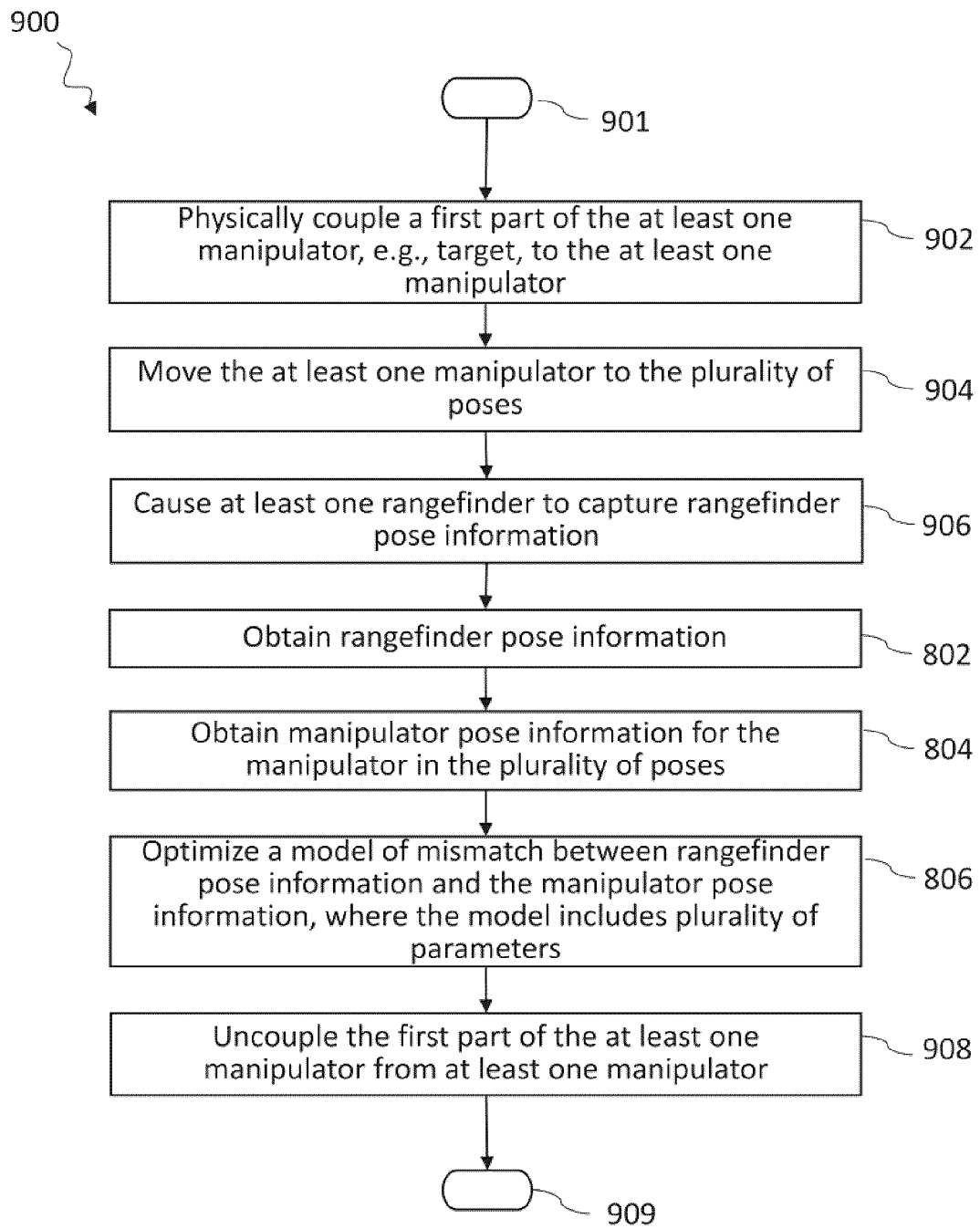
FIG. 9 is a flow-diagram of an implementation of a method of operation in a system including at least one manipulator, and a removable target such as shown in FIG. 7.

FIG. 9 shows a method 900 of operation of a system including at least one rangefinder and at least one manipulator. Circuitry, e.g., at least one hardware processor, controls method 900. Method 900, in part, includes acquisition of calibration data and may include use of a removable target. In some implementations, method 900 includes use of a removable target. Those of skill in the art will appreciate that other acts may be included, removed, and/or varied or performed in a different order to accommodate alternative implementations of method 900.

Method 900 begins at 901, for example in response to a call from a routine or program, start up or an application of power to the system, or otherwise invoked.

Optionally at 902, the controller causes (e.g., directs) an agent, such as, human worker (e.g., human worker 461) or a robot (e.g. robot 102), to physically couple a target (e.g., a first part of the at least one manipulator) to the at least one manipulator. The first part of the at least one manipulator may include an optical marker or target, such as, described in relation to, at least, FIG. 7.

In some implementations, the first part of the at least one manipulator may be an included part of a manipulator or manipulator and end-effector. For example, a manipulator may include a target as part of its structure (e.g., etched in metal) or skin (e.g., painted on). In some implementations, e.g., when 902 is not present, the first part of the at least one manipulator may be an intrinsic part of the at least one manipulator. For example, the first part may be a plurality of keypoints as identified by Scale-Invariant Feature Transformation (SIFT) method.

At 904, the controller causes the at least one manipulator to move to a plurality of positions. For example, the controller causes the at least one manipulator to move to the plurality of positions described at 802 in method 800.

At 906, the controller causes the at least one rangefinder to capture the rangefinder pose information. For example, the controller causes the at least one rangefinder to capture a first plurality of distances between the at least one rangefinder and the first part of the at least one manipulator in the plurality of poses. At 906 the controller, or a processor included in the at least one rangefinder, may extract the rangefinder pose information from the first plurality of distances. For example, the rangefinder includes a pair of cameras and at 906 the controller receives a plurality of images from the pair of cameras. In some implementations, the rangefinder provides a plurality of the first plurality of distances to the controller, e.g., periodic or aperiodic update to the first plurality of distances.

At 802, the controller obtains rangefinder pose information. At 804, the controller obtains manipulator pose information. At 806, the controller optimizes a model of mismatch between depth information and the manipulator pose information. For example, at 806, the controller varies a plurality of parameters included in the model of mismatch.

Optionally at 908, the controller causes the agent to uncouple the first part of the at least one manipulator from at least one manipulator. For example, the agent uncouples target 706, holder 704, and standoff 702 from manipulator 406. In some implementations, the first part of the at least one manipulator remains coupled to the at least one manipulator.

Method 900 ends at 909 until invoked again.

Figure 10:
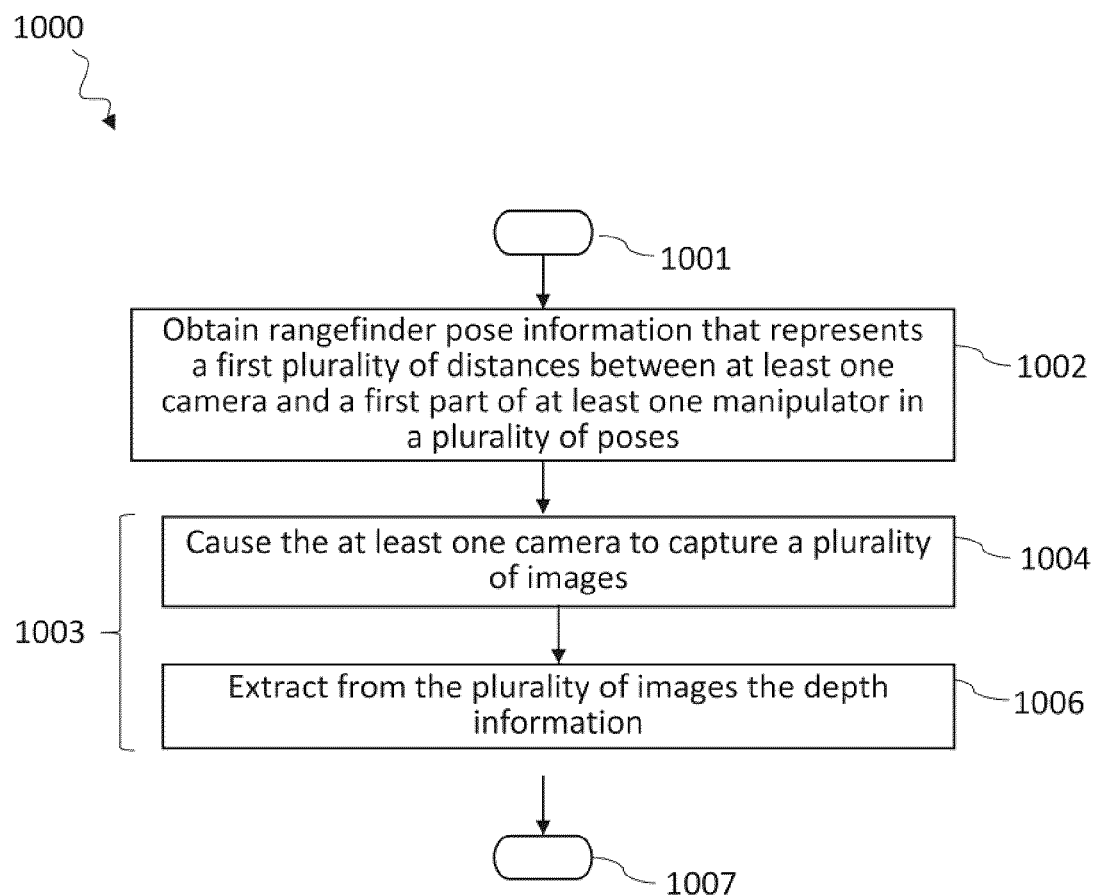
FIG. 10 is a flow-diagram of an implementation of a method of operation in a system including at least one processor, at least one manipulator, and at least one camera.

FIG. 10 shows method 1000 controlled by circuitry, e.g., at least one hardware processor. Method 1000 is a method of operation of a system including at least one processor and at least one camera. Method 1000, in part, describes extraction of processor-readable information from one or more images created by at least one camera. Method 1000 may be included in other methods such as method 800, e.g., replacing or included in act 802. Those of skill in the art will appreciate that other acts may be included, removed, and/or varied or performed in a different order to accommodate alternative implementations.

Method 1000 begins at 1001, for example in response to a call from a routine or program, start up or an application of power to the system, or otherwise invoked.

At 1002, the controller obtains (e.g., receives) rangefinder pose information which represents, at least, a first plurality of distances between at least one camera and a first part of at least one manipulator in a plurality of poses. The controller can receive the rangefinder information from the at least one camera, e.g., stereo camera, depth sense camera. Act 1002 may include one or more acts in a sub-method 1003. Sub-method 1003 may include act 1004 or act 1006.

Optionally at 1004, the controller causes the at least one camera to capture a plurality of images. For example, the controller causes the at least one camera to trip at least one shutter and store the plurality of images. In various implementations including two or more cameras the shutters are synchronized. The shutters may be may be mechanical or synchronized methods to received information from image sensors in a time coordinated way. Alternatively, the at least one camera may capture images, for example continuously or periodically or even aperiodically, without being triggered or activated by the controller. A suitable image capture system may, for example, take the form one or more motion activated input device, e.g., Kinect sensor systems available from Microsoft Corp. of Redmond, Wash., US.

At 1006, the controller extracts from the plurality of images the depth information. For example, the controller determines relative orientation of two or more cameras; computes disparity information for one or more common items or keypoints in images received from the orientation of the two or more cameras; and extracts rangefinder pose information (e.g., depth information) from the disparity information.

Method 1000 ends at 1007.

Figure 11:
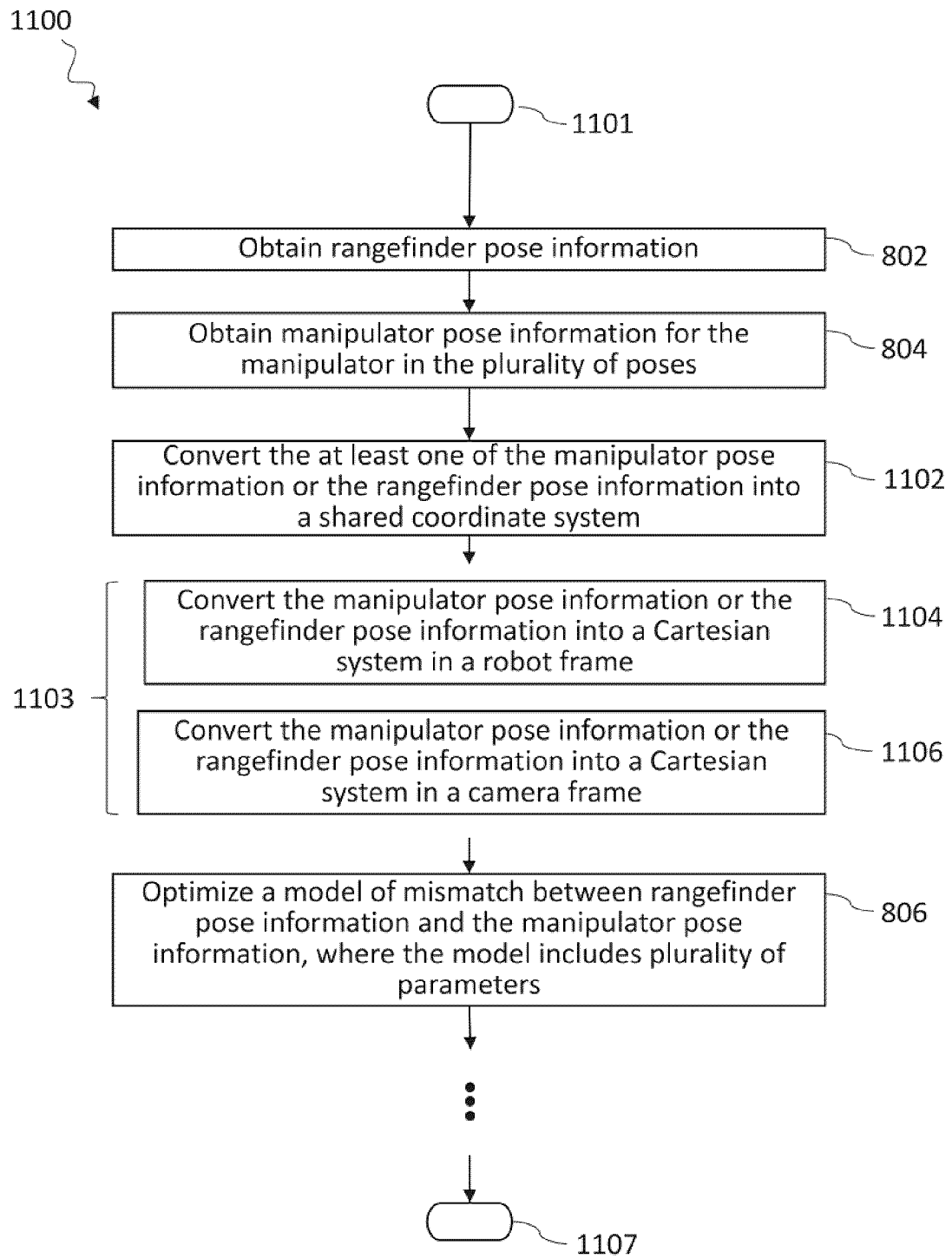
FIG. 11 is a flow-diagram of an implementation of a method of operation in a system including at least one processor, at least one rangefinder, and at least one manipulator.

FIG. 11 shows method 1100 controlled by circuitry, e.g., at least one hardware processor. Method 1100 is a method of operation of a system including at least one rangefinder and at least one manipulator. Method 1100, in part, describes conversion of processor-readable information to a shared coordinate system. Those of skill in the art will appreciate that other acts may be included, removed, and/or varied or performed in a different order to accommodate alternative implementations.

Method 1100 begins at 1101, for example in response to a call from a routine or program, start up or an application of power to the system, or otherwise invoked.

At 802, the controller obtains (e.g., receives, requests and receives) rangefinder pose information. At 804, the controller receives manipulator pose information.

At 1102, the controller converts the at least one of the manipulator pose information or the rangefinder pose information into a shared coordinate system. The controller may convert a first plurality of numbers that represents a point in space to a second plurality of numbers that represents the point. The shared coordinate system may be a Cartesian or polar coordinate system. Act 1102 may include one or more act in a sub-method 1103. Sub-method 1103 may include act 1104 or act 1106.

At 1104, the controller may convert the manipulator pose information or the rangefinder pose information into a Cartesian system in a robot frame. For example, the controller converts the manipulator pose information into a Cartesian coordinate system. In some implementations, the controller converts a plurality of joint positions, e.g., angles or displacements, and link geometries into a position in the Cartesian coordinate system with a coordinate frame with origin at the base (e.g., pedestal) of the at least one manipulator. The robot frame may, for example, be right-handed.

At 1106, the controller converts the manipulator pose information or the rangefinder pose information into a Cartesian system in a camera frame. The camera frame may be left-handed. The camera frame may include an axis aligned with the optical axis of a rangefinder or a camera.

At 806, the controller optimizes a plurality of parameters included in a model of mismatch between rangefinder pose information and the manipulator pose information. The model may include as input the manipulator pose information and the rangefinder pose information in a shared coordinate system and shared coordinate frame.

Figure 12:
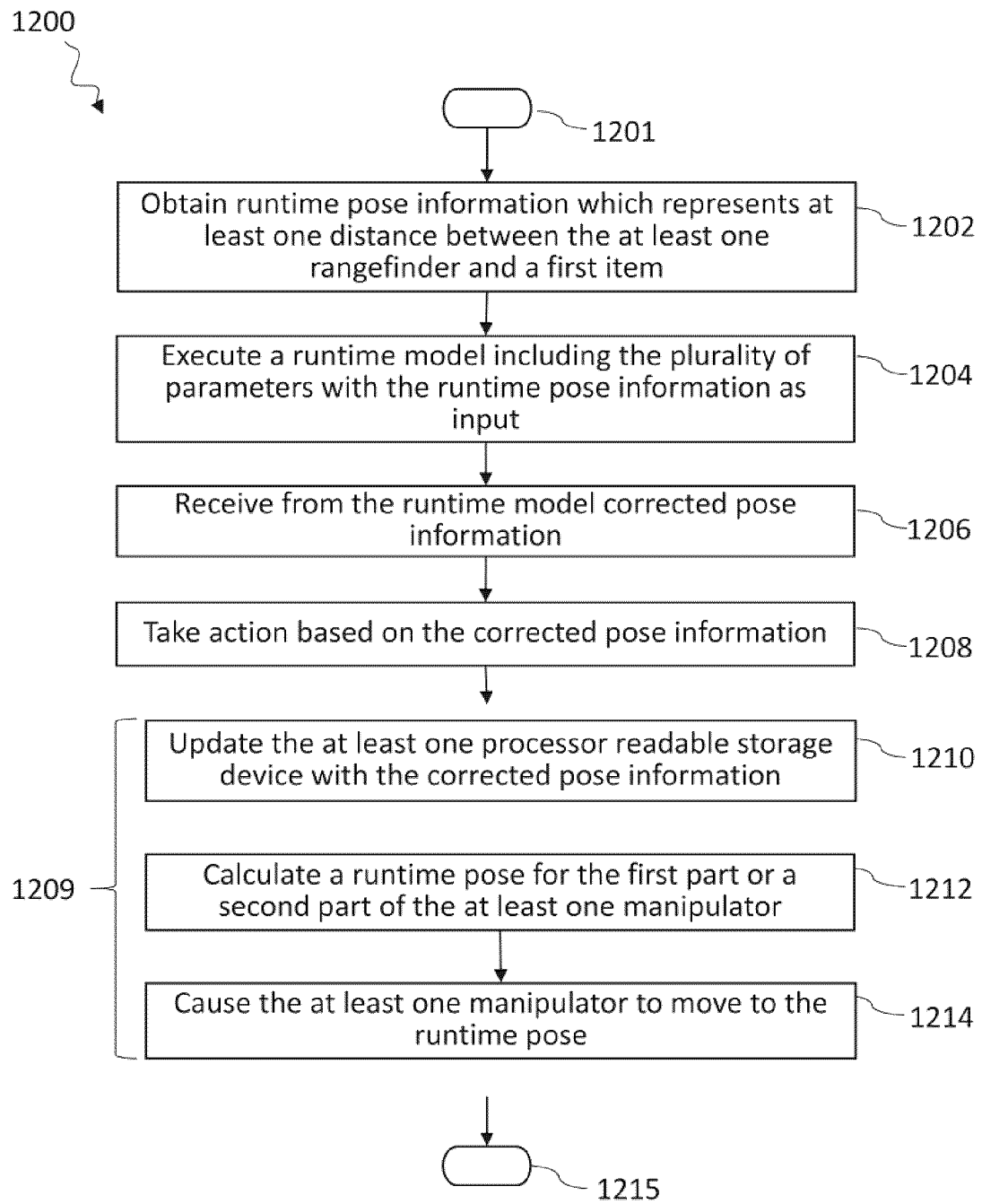
FIG. 12 is a flow-diagram of an implementation of a method of operation of a system including at least one rangefinder and at least one manipulator.

Method 1100 may include further acts including those shown and described in relation to method 800, e.g., act 808; or method 1200 shown and described in relation to FIG. 12.

Method 1100 ends at 1107 until invoked again.

FIG. 12 shows a method 1200 of operation of a system including at least one rangefinder and at least one manipulator. Circuitry, e.g., at least one hardware processor, controls method 1200. Method 1200, in part, includes acquisition of runtime data from one or more sensors and further operations based on the runtime data and calibration data. In some implementations, method 1200 includes use of a removable target. Those of skill in the art will appreciate that other acts may be included, removed, and/or varied or performed in a different order to accommodate alternative implementations of method 1200.

Method 1200 begins at 1201, for example in response to a call from a routine or program, start up or an application of power to the system, or otherwise invoked.

At 1202, the controller obtains (e.g., receives) runtime pose information which represents at least one distance between the at least one rangefinder and a first item. The first item may an item in input space 408. The controller may receive the runtime pose information from at least one rangefinder.

At 1204, the controller executes a runtime model including the plurality of parameters and that accepts the runtime pose information as input. In some implementations, the runtime model is a transformation from runtime pose information into the coordinate system and reference frame of at least one manipulator. In some implementations, the runtime model is included in models 270 stored in storage device(s) 208. In some implementations, the runtime model includes an affine transform including one more sub-transformations: translation, scale, shear, or rotation.

At 1206, the controller receives corrected pose information, for example from the runtime model. For instance, the controller receives a pose for the item as if the at least one manipulator operates without spatial error.

At 1208, the controller takes action based on the corrected pose information. Act 1208 may include sub-method 1209.

Sub-method 1209 may include one or more acts such as act 1210, act 1212, and act 1214.

At 1210, the controller updates at least one processor-readable storage device with the corrected pose information. For example, the controller updates storage device(s) 208 with the corrected depth information received from the runtime model at 1206.

At 1212, the controller calculates a runtime pose for the first part of at least one manipulator, or a second part of the at least one manipulator. The first part of the at least one manipulator may be a removable target used in methods, for example method 800 at the train phase. The first part of the at least one manipulator may be a part of the manipulator or a device coupled to the manipulator, e.g., end-effector, optical target. The second part of the at least one manipulator may be a part of the manipulator or a device coupled to the manipulator, e.g., end-effector.

At 1214, the controller causes the at least one manipulator to move to the runtime pose. For example, the controller causes the distal end of the at least one manipulator to move proximate the item.

Method 1200 ends at 1215. Method 1200 may include further acts including those shown and described in relation to method 800 and method 1100.

The above description of illustrated examples, implementations, and embodiments, including what is described in the Abstract, is not intended to be exhaustive or to limit the embodiments to the precise forms disclosed. Although specific examples are described herein for illustrative purposes, various equivalent modifications can be made without departing from the spirit and scope of the disclosure, as will be recognized by those skilled in the relevant art. The teachings provided herein of the various embodiments can be applied to many computer systems, robotic systems, and robots, not necessarily the exemplary computer systems, robotic systems, and robots herein and generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each act and/or operation within such block diagrams, flowcharts, or examples can be implemented, individually and/or collectively, by a wide range of hardware, software, firmware, or combinations thereof. In some embodiments, the present subject matter is implemented via Application Specific Integrated Circuits (ASICs). However, those skilled in the art will recognize that the embodiments disclosed herein, in whole or in part, can be equivalently implemented in standard integrated circuits, as one or more computer programs (i.e., processor-executable instructions) executed by one or more processor based devices (e.g., as one or more sets of processor-executable instructions running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the source code for the software and or firmware would be well within the skill of one of ordinary skill in the art in light of the teachings of this disclosure.

As used herein processor-executable instructions and/or processor-readable data can be stored on any non-transitory computer-readable storage medium, e.g., memory or disk, for use by or in connection with any processor-related system or method. In the context of this specification, a "computer-readable storage medium" is one or more tangible non-transitory computer-readable storage medium or element that can store processes-executable instruction and/or processor-readable data associated with and/or for use by systems, apparatus, device, and/or methods described herein. The computer-readable storage medium can be, for example, but is not limited to, an electronic, magnetic, optical, electromagnetic, infrared, or semiconductor system, apparatus, device, or articles of manufacture. Processor-executable instructions are readable by a processor. More specific examples (a non-exhaustive list) of the computer-readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory storage media.

Many of the methods described herein can be performed with variations. For example, many of the methods may include additional acts, omit some acts, and/or perform acts in a different order than as illustrated or described.

The various examples, implementations, and embodiments described above can be combined to provide further embodiments. Aspects of the embodiments can be modified, if necessary, to employ systems, circuits, devices, methods, and concepts in various patents, applications, and publications to provide yet further embodiments.

This application claims the benefit of U.S. Provisional Patent Application No. 62/588,821, filed Nov. 20, 2017, and is incorporated herein by reference in its entirety.

These and other changes can be made to the examples, implementations, and embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
a frame;
at least one processor;
at least one rangefinder communicatively coupled to the at least one processor and, at least, temporarily coupled to the frame;
at least one manipulator physically coupled to the frame; and
at least one nontransitory processor-readable storage device communicatively coupled to the at least one processor which stores processor-executable instructions which, when executed by the at least one processor, cause the at least one processor to:
 obtain rangefinder pose information which represents, at least, a first plurality of distances between the at least one rangefinder and a first part of the at least one manipulator in a plurality of poses, wherein a respective distance in the first plurality of distances corresponds to at least one respective pose in the plurality of poses;
 obtain for the at least one manipulator, manipulator pose information;
 optimize a model of mismatch between rangefinder pose information and the manipulator pose information, wherein the model of mismatch includes an affine transform, and wherein the model of mismatch calculates a discrepancy between the manipulator pose information and depth information contained in the rangefinder pose information using the affine transform; and
 cause the at least one manipulator to move to the plurality of poses using the optimized model of mismatch.

2. The system of claim 1, further comprising:
an optical target located at the first part of the at least one manipulator.

3. The system of claim 1, further comprising:
an optical target removably coupled to the at least one manipulator at the first part of the at least one manipulator.

4. The system of claim 1, wherein the at least one manipulator comprises an end-effector and the first part of the manipulator is a portion of the end-effector.

5. The system of claim 1, wherein the at least one manipulator comprises a detachable end-effector and the first part of the manipulator is a portion of the detachable end-effector.

6. The system of claim 1, wherein the at least one manipulator comprises an end-effector and the first part is a portion of the end-effector, and further comprising:
an optical target located at the first part.

7. The system of claim 1, wherein the at least one manipulator comprises an end-effector and the first part is a portion of the end-effector, and further comprising:
a standoff coupled to the end-effector; and
an optical target carried by the standoff.

8. The system of claim 1, wherein the at least one manipulator comprises an end-effector and the first part is a portion of the end-effector with an optical target inscribed thereon.

9. The system of claim 1, wherein the at least one rangefinder includes at least one camera with a respective field-of-view, the at least one camera positioned and oriented such that the respective field-of-view of the at least one camera encompass at least a portion of a volume in which the manipulator is positionable through a set of a plurality of poses.

10. The system of claim 1, wherein:
the at least one rangefinder includes at least one camera; and
when executed, the processor-executable instructions further cause the at least one processor to:
 cause the at least one camera to capture a plurality of images, wherein at least one respective image in the plurality of images includes a representation of the first part of the at least one manipulator in a respective pose included in the plurality of poses; and
 extract from the plurality of images the rangefinder pose information.

11. The system of claim 1 wherein, when executed, the processor-executable instructions further cause the at least one processor to:
convert the at least one of the manipulator pose information or the rangefinder pose information into a shared coordinate system.

12. The system of claim 11, wherein, when executed, the processor-executable instructions to convert the at least one of the manipulator pose information or the rangefinder pose information into the shared coordinate system, further cause the at least one processor to:

convert the manipulator pose information or the rangefinder pose information into a Cartesian system in a robot coordinate frame.

13. The system of claim 11, wherein, when executed, the processor-executable instructions to convert the at least one of the manipulator pose information or the rangefinder pose information into the shared coordinate system, further cause the at least one processor to:

convert the manipulator pose information or the rangefinder pose information into a Cartesian system in a camera coordinate frame.

14. The system of claim 1 wherein, when executed, the processor-executable instructions further cause the at least one processor to:

obtain runtime pose information which represents at least one distance between the at least one rangefinder and a first item;

execute a runtime model with the runtime pose information as input; and receive, from the runtime model, corrected runtime pose information for the first item.

15. The system of claim 14 wherein, when executed, the processor-executable instructions further cause the at least one processor to:

calculate a runtime pose for the first part or a second part of the at least one manipulator.

16. The system of claim 15 wherein, when executed, the processor-executable instructions further cause the at least one processor to:

cause the at least one manipulator to move to the runtime pose.

17. The system of claim 15 wherein:

the second part of the at least one manipulator includes an end-effector.

18. The system of claim 14 wherein, when executed, the processor-executable instructions further cause the at least one processor to:

update the at least one processor readable storage device with the corrected runtime pose information for the first item.

19. A method in a robotic system including at least one rangefinder, at least one manipulator, and at least one processor in communication with the at least one rangefinder, the method comprising:

obtaining, by the at least one processor from the at least one rangefinder, rangefinder pose information which represents, at least, a first plurality of distances between the at least one rangefinder and a first part of the at least one manipulator in a plurality of poses, wherein a respective distance in the first plurality of distances corresponds to at least one respective pose in the plurality of poses;

obtaining, by the at least one processor, manipulator pose information;

optimizing, by the at least one processor, a model of mismatch between the rangefinder pose information and the manipulator pose information, wherein the model of mismatch includes an affine transform, and wherein the model of mismatch calculates a discrepancy between the manipulator pose information and depth information contained in the rangefinder pose information using the affine transform; and causing, by the at least one processor, the at least one manipulator to move to the plurality of poses using the optimized model of mismatch.

20. The method of claim 19, further comprising:

physically coupling the first part of the at least one manipulator to the at least one manipulator.

21. The method of claim 19, wherein the at least one rangefinder includes at least one camera, the method further comprises autonomously capturing image information by the at least one camera.

22. The method of claim 19, wherein the at least one rangefinder includes at least one camera, the method further comprises:

causing, by the at least one processor, the at least one camera to capture a plurality of images, wherein at least one respective image in the plurality of images includes the at least one manipulator in a respective pose included in the plurality of poses; and extracting, by the at least one processor, from the plurality of images the rangefinder pose information.

23. The method of claim 19 further comprising:

converting, by the at least one processor, at least one of the manipulator pose information or the rangefinder pose information into a shared coordinate system.

24. The method of claim 23, wherein converting at least one of the manipulator pose information or the rangefinder pose information into a shared coordinate system, further comprises:

converting, by the at least one processor, the manipulator pose information or the rangefinder pose information into a Cartesian system in a robot coordinate frame.

25. The method of claim 23, wherein converting at least one of the manipulator pose information or the rangefinder pose information into a shared coordinate system, further comprises:

converting, by the at least one processor, the manipulator pose information or the rangefinder pose information into a Cartesian system in a camera coordinate frame.

26. The method of claim 19, further comprising:

obtaining, by the at least one processor from the at least one rangefinder, runtime depth information which represents at least one distance between the at least one rangefinder and a first item;

executing, by the at least one processor, a runtime model with the runtime depth information as input;

receiving, by the at least one processor from the runtime model, corrected depth information for the first item; and updating, by the at least one processor, the at least one processor readable storage device with the corrected depth information for the first item.

27. The method of claim 26, further comprising:

calculating, by the at least one processor, a runtime pose for the first part or a second part of the at least one manipulator.

28. The method of claim 27, further comprising:

causing, by the at least one processor, the at least one manipulator to move to the runtime pose.

* * * * *